(12) United States Patent
Smith

(10) Patent No.: US 6,581,525 B2
(45) Date of Patent: Jun. 24, 2003

(54) METHOD AND APPARATUS FOR TRANSPORTING AND STEERING A LOAD

(75) Inventor: Harlan B Smith, Hillsboro, OR (US)

(73) Assignee: Columbia Trailer Co., Inc., Hillsboro, OR (US)

( * ) Notice: Subject to any disclaimer, the term of this patent is extended or adjusted under 35 U.S.C. 154(b) by 0 days.

(21) Appl. No.: 09/852,434

(22) Filed: May 9, 2001

(65) Prior Publication Data

US 2002/0185319 A1 Dec. 12, 2002

(51) Int. Cl.[7] .......................... B61B 12/10; B62D 51/06
(52) U.S. Cl. .......................................... 104/96; 180/8.1
(58) Field of Search .................... 104/96, 102, 126, 104/134; 180/8.1, 8.5, 8.6

(56) References Cited

U.S. PATENT DOCUMENTS

| | | | |
|---|---|---|---|
| 1,709,741 A | 4/1929 | Romine | |
| 2,399,417 A | 4/1946 | Wilson et al. | |
| 2,660,253 A | 11/1953 | Davidson | |
| 3,255,836 A | 6/1966 | Hoppmann et al. | |
| 3,486,576 A | 12/1969 | Breon et al. | |
| 3,512,597 A | 5/1970 | Baron | |
| 3,576,225 A | 4/1971 | Chambers | |

(List continued on next page.)

FOREIGN PATENT DOCUMENTS

| | | |
|---|---|---|
| SU | 318698 | 10/1971 |
| SU | 0676698 | 8/1979 |

*Primary Examiner*—Mark T. Le
*Assistant Examiner*—Robert J. McCarry, Jr.
(74) *Attorney, Agent, or Firm*—Kolisch Hartwell, P.C.

(57) ABSTRACT

A load-carrying transport apparatus for moving a heavy load, such as an oil drilling rig, over a surface includes a substructure for carrying the load, a track member positioned on the surface adjacent the substructure and a plurality of lift assemblies mounted on the substructure selectively operable for extension toward the surface to engage the track member and raise the substructure above the surface so that it is carried on the track member. The lift assemblies are also operable for retraction to lower the substructure onto the surface. A shifter mechanism disposed adjacent to the substructure and the track member is selectively operable for displacing the substructure along the track member when the lifting assemblies have been extended toward the surface to raise the substructure above the surface. The shifter mechanism is also operable for displacing the track member on the surface relative to the substructure when the lifting assemblies have been retracted and disengaged from the track member. The track member is dimensioned to provide a steering area and at least one of the lifting assemblies is selectively positionable to a predetermined angle within a range for moving in the steering area along the track member so that the load-carrying apparatus can be steered along a selected direction.

43 Claims, 18 Drawing Sheets

U.S. PATENT DOCUMENTS

| | | |
|---|---|---|
| 3,612,201 A | 10/1971 | Smith |
| 3,680,321 A | 8/1972 | Bordes |
| 3,693,363 A | 9/1972 | Van den Kroonenberg |
| 3,693,741 A | 9/1972 | Scheuerle |
| 3,754,790 A | 8/1973 | Mappin et al. |
| 3,769,276 A * | 10/1973 | Maeda .......................... 180/8 |
| 3,769,802 A | 11/1973 | Wefer |
| 3,796,276 A | 3/1974 | Maeda |
| 3,807,519 A | 4/1974 | Patch |
| 3,828,689 A | 8/1974 | Raffenberg |
| 3,903,979 A | 9/1975 | Perrotin |
| 3,921,739 A | 11/1975 | Rich et al. |
| 3,946,823 A * | 3/1976 | Oler ........................... 180/23 |
| 4,014,266 A | 3/1977 | Näslund et al. |
| 4,014,399 A | 3/1977 | Ruder |
| 4,033,056 A | 7/1977 | Demmers |
| RE29,541 E | 2/1978 | Russell |
| 4,212,450 A | 7/1980 | Lambert |
| 4,288,177 A | 9/1981 | Schoonmade |
| 4,372,407 A | 2/1983 | McColl |
| 4,519,468 A | 5/1985 | Mick |
| 4,674,949 A | 6/1987 | Kroczynski |
| 4,823,870 A | 4/1989 | Sorokan |
| 5,032,040 A | 7/1991 | Ingle |
| 5,453,931 A | 9/1995 | Watts, Jr. |
| 5,492,436 A | 2/1996 | Suksumake |
| 5,496,013 A | 3/1996 | Lussier |
| 5,921,336 A | 7/1999 | Reed |
| 6,059,056 A | 5/2000 | Becker |

* cited by examiner

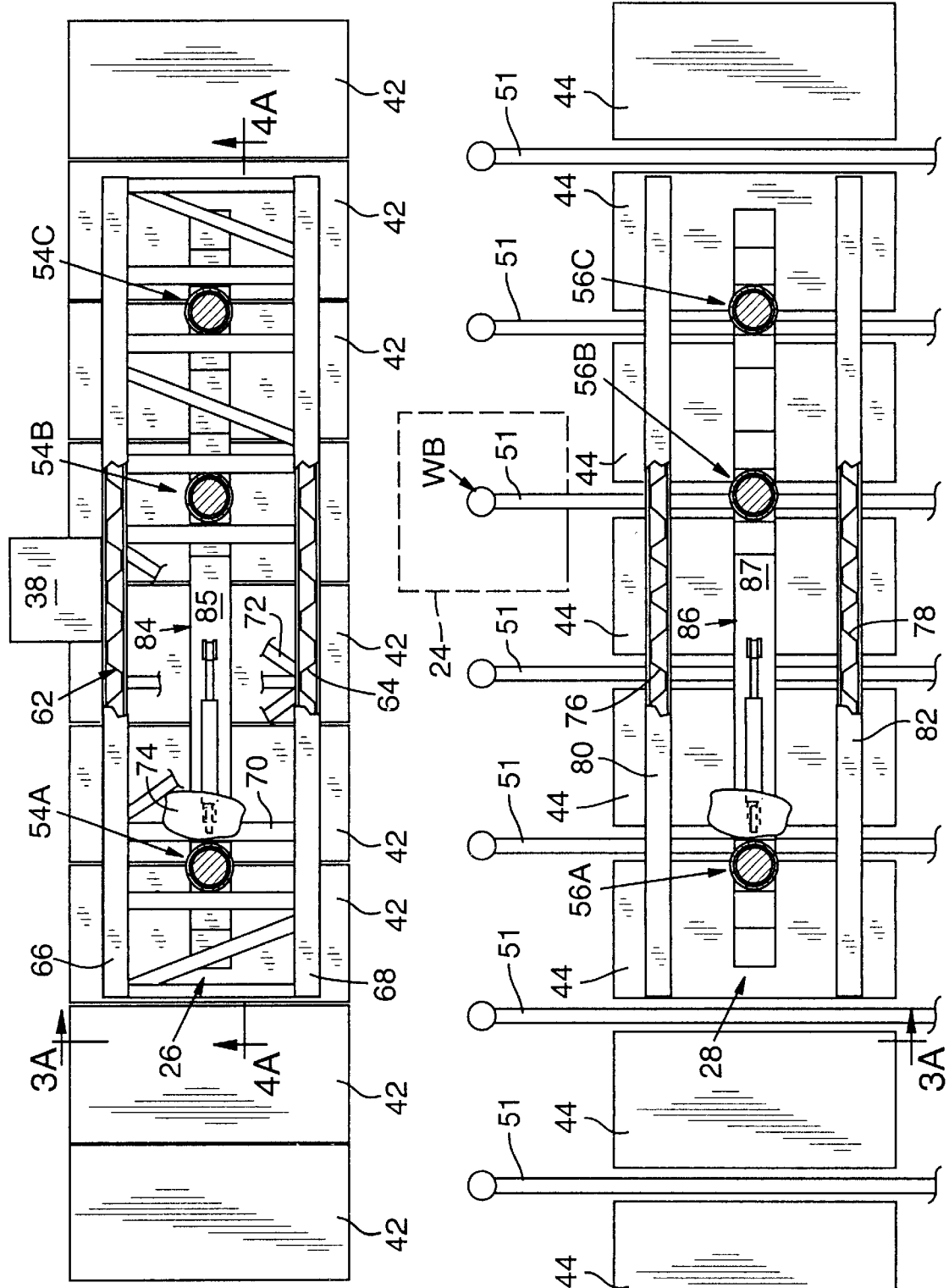

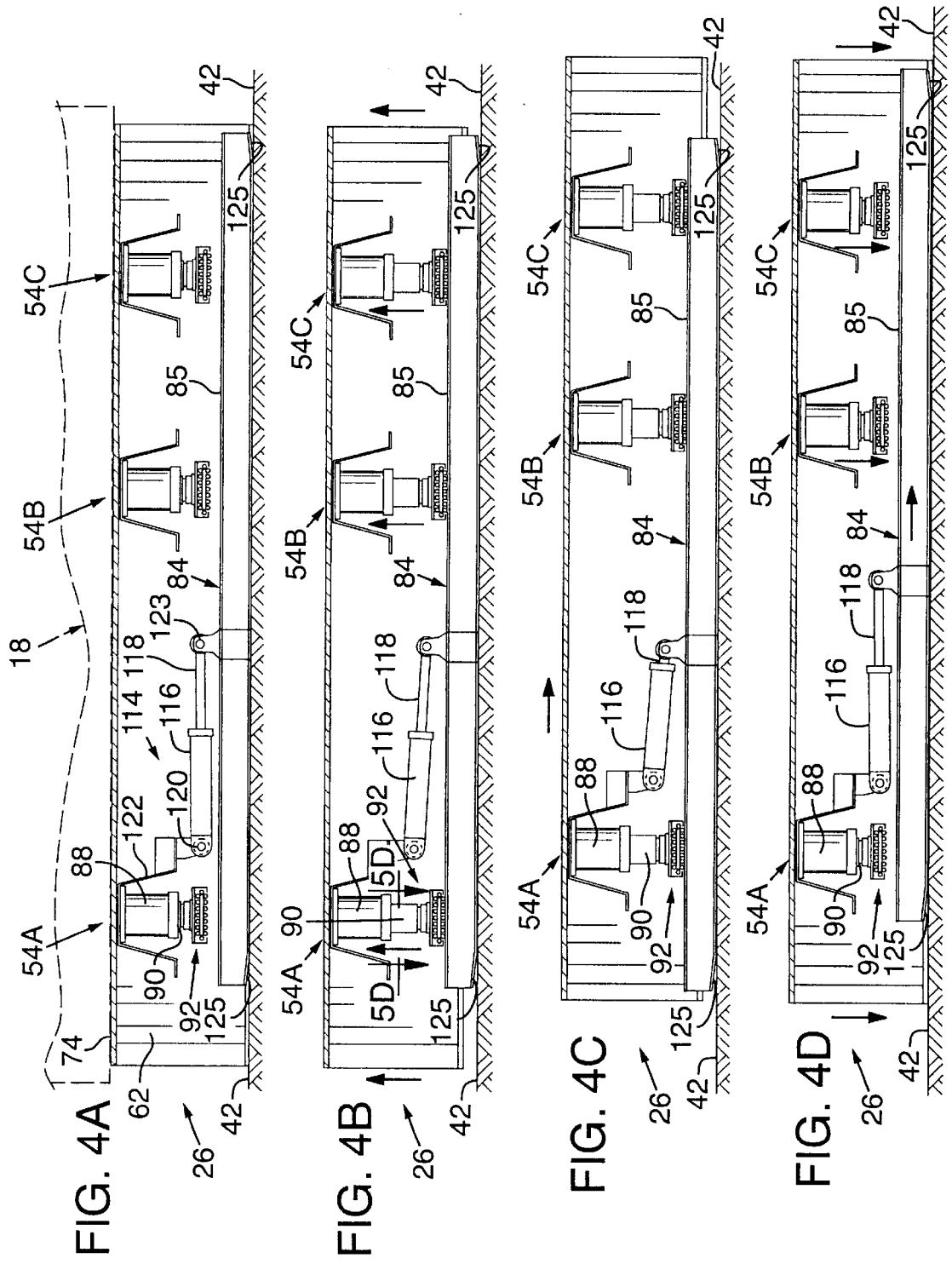

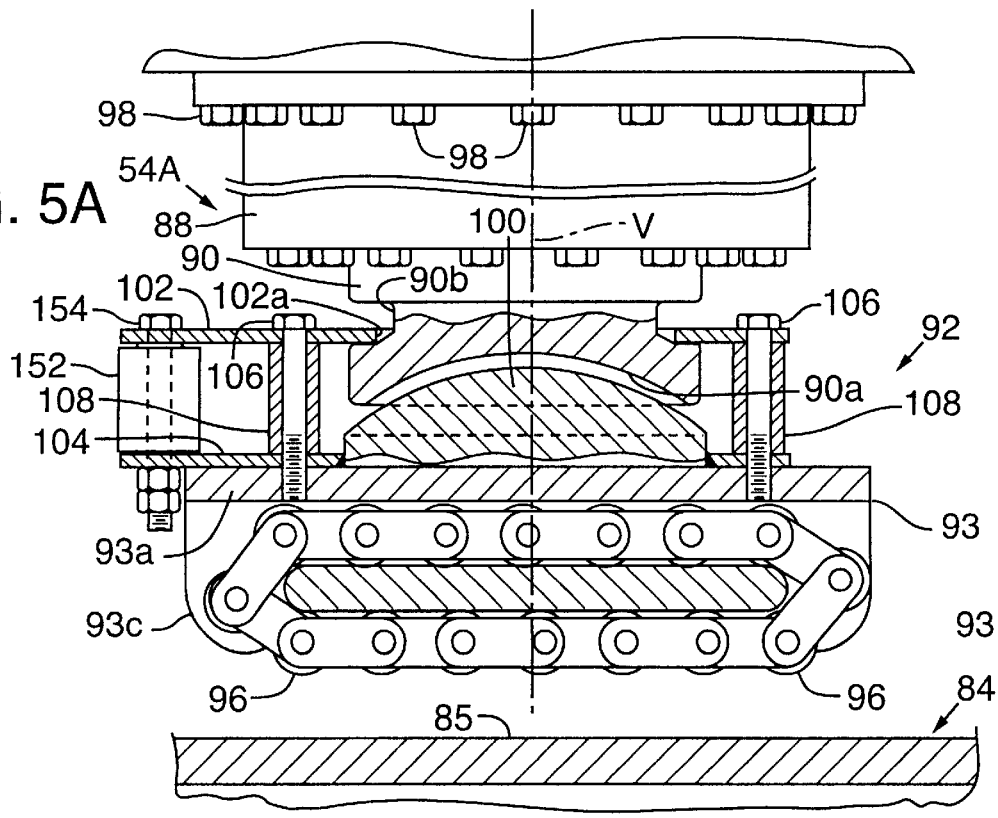
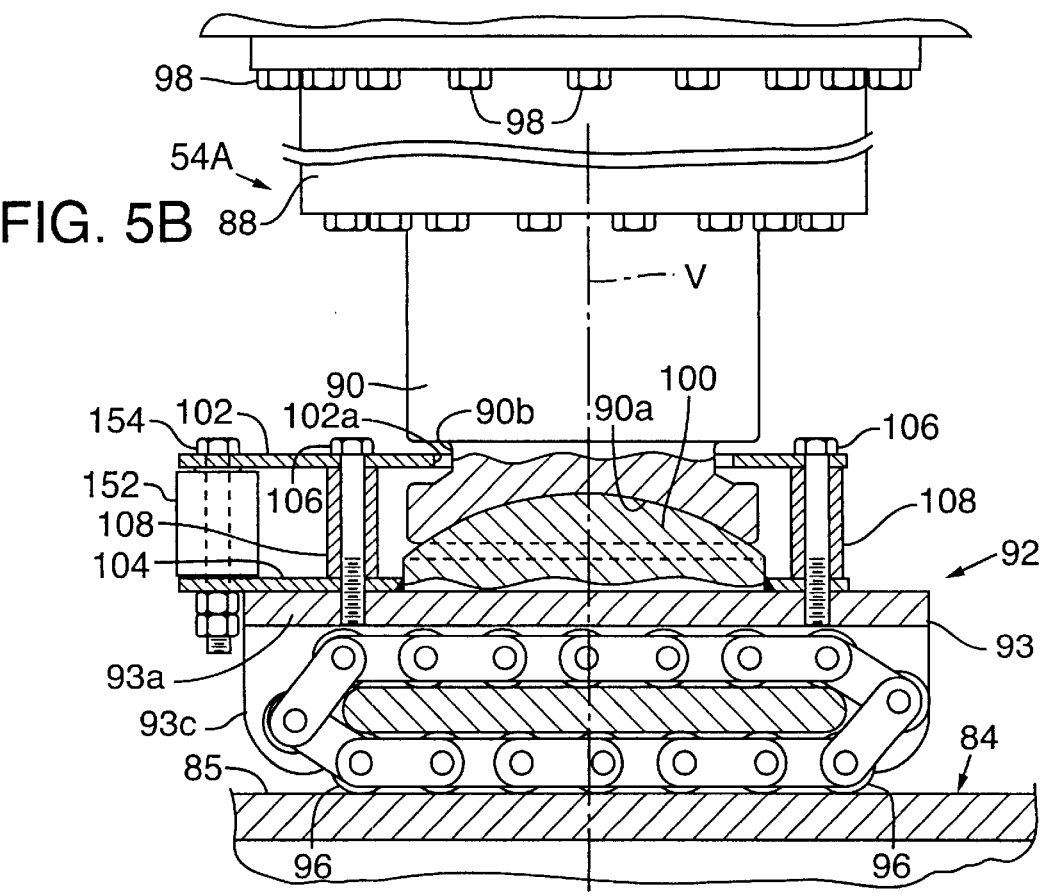

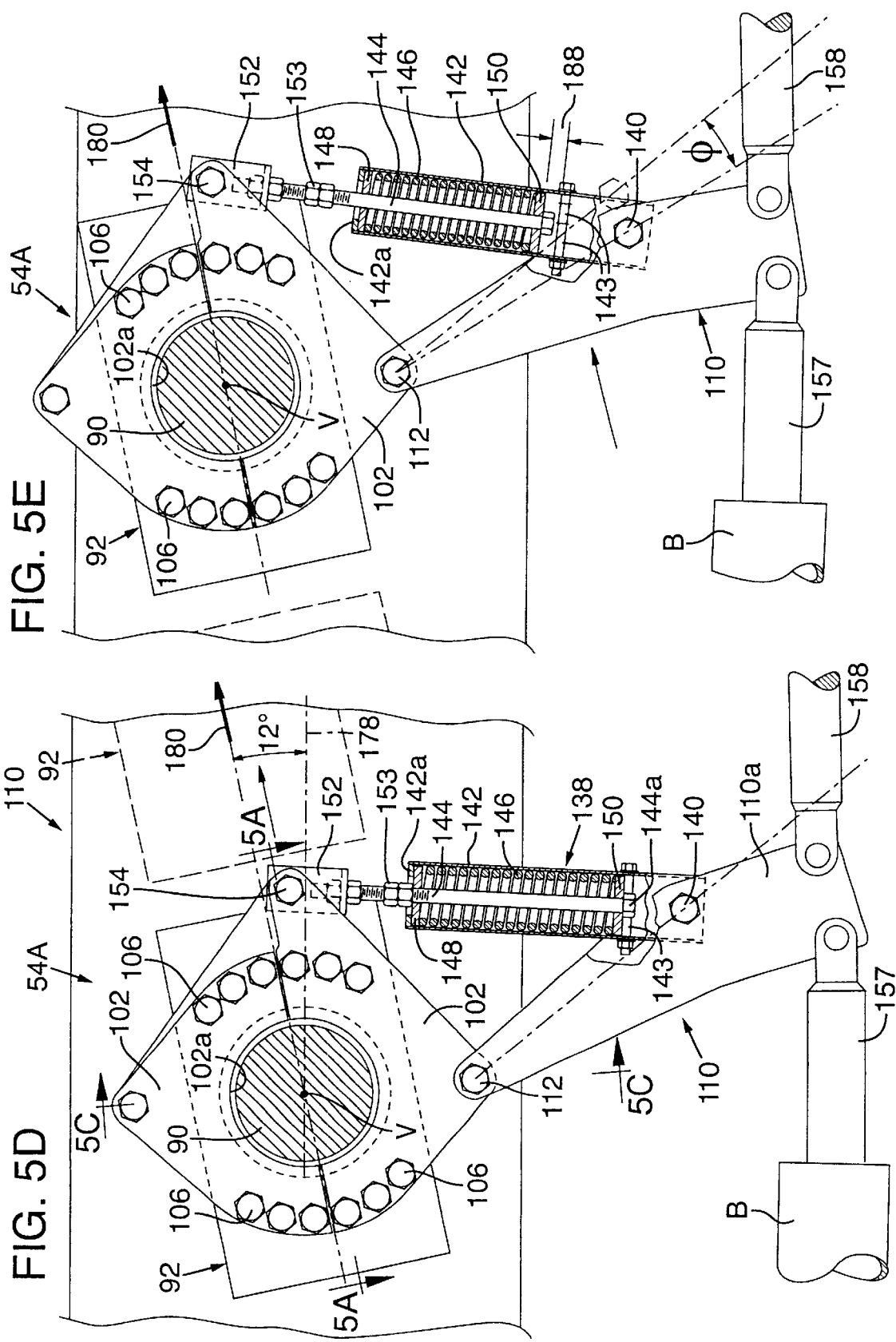

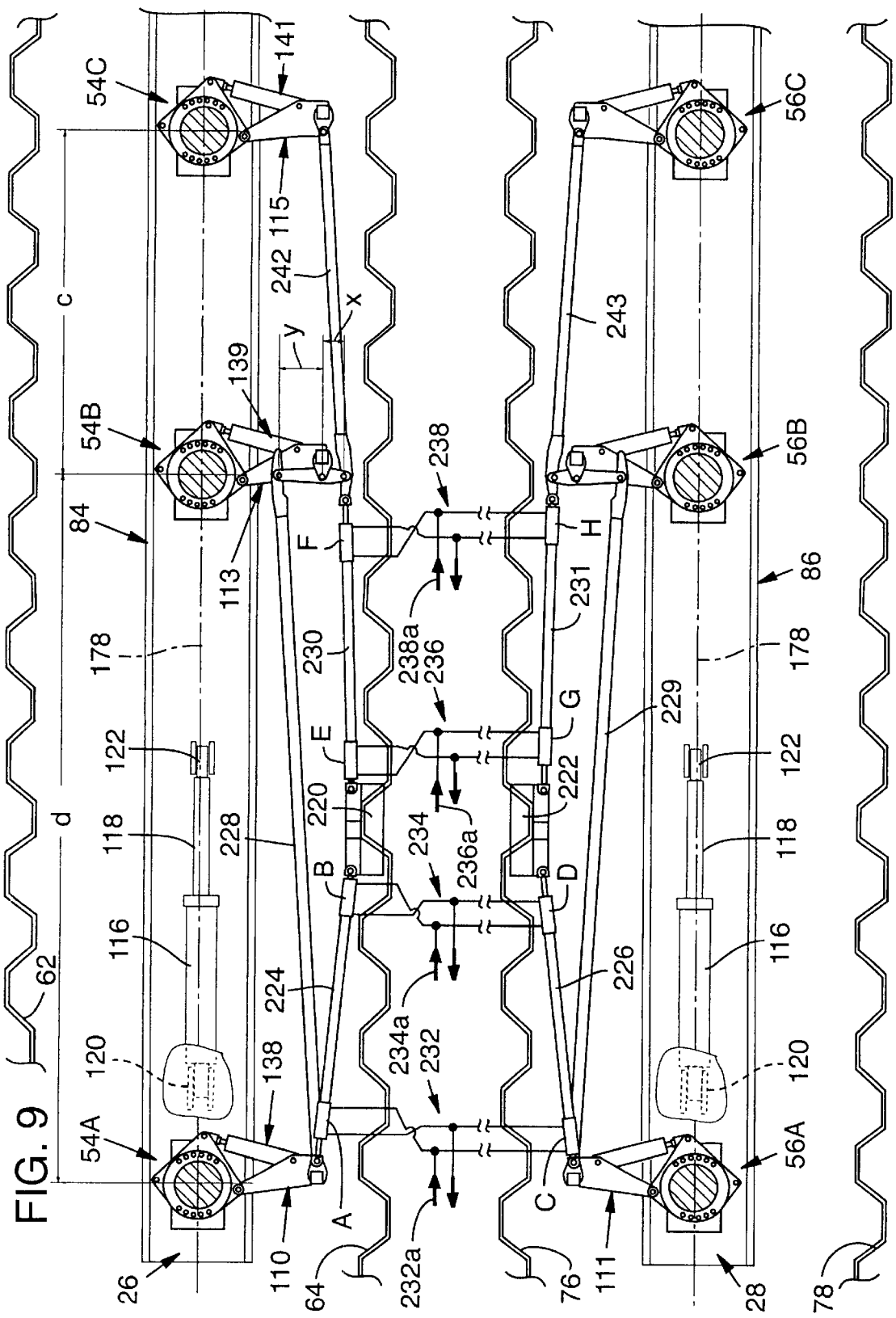

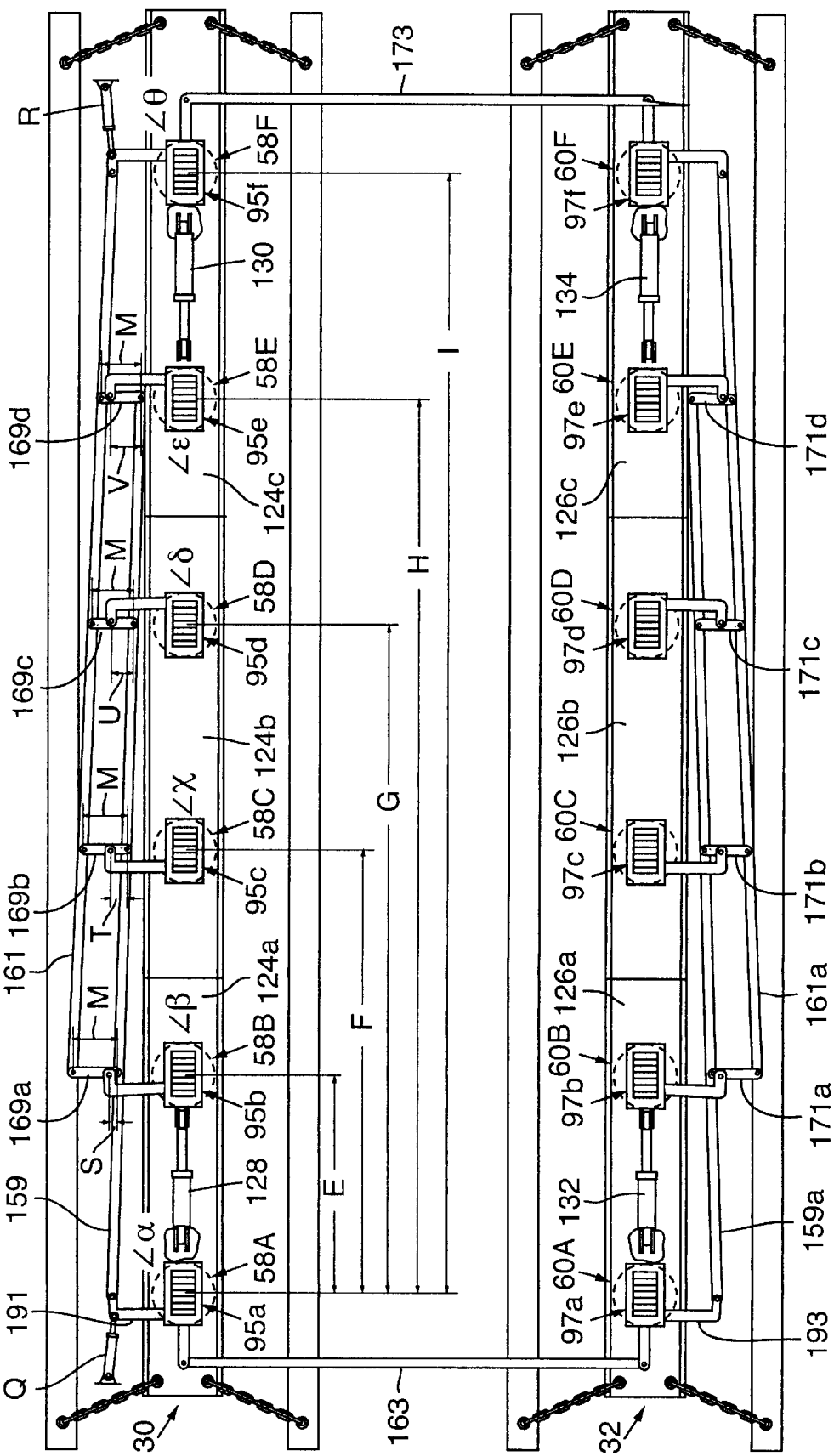

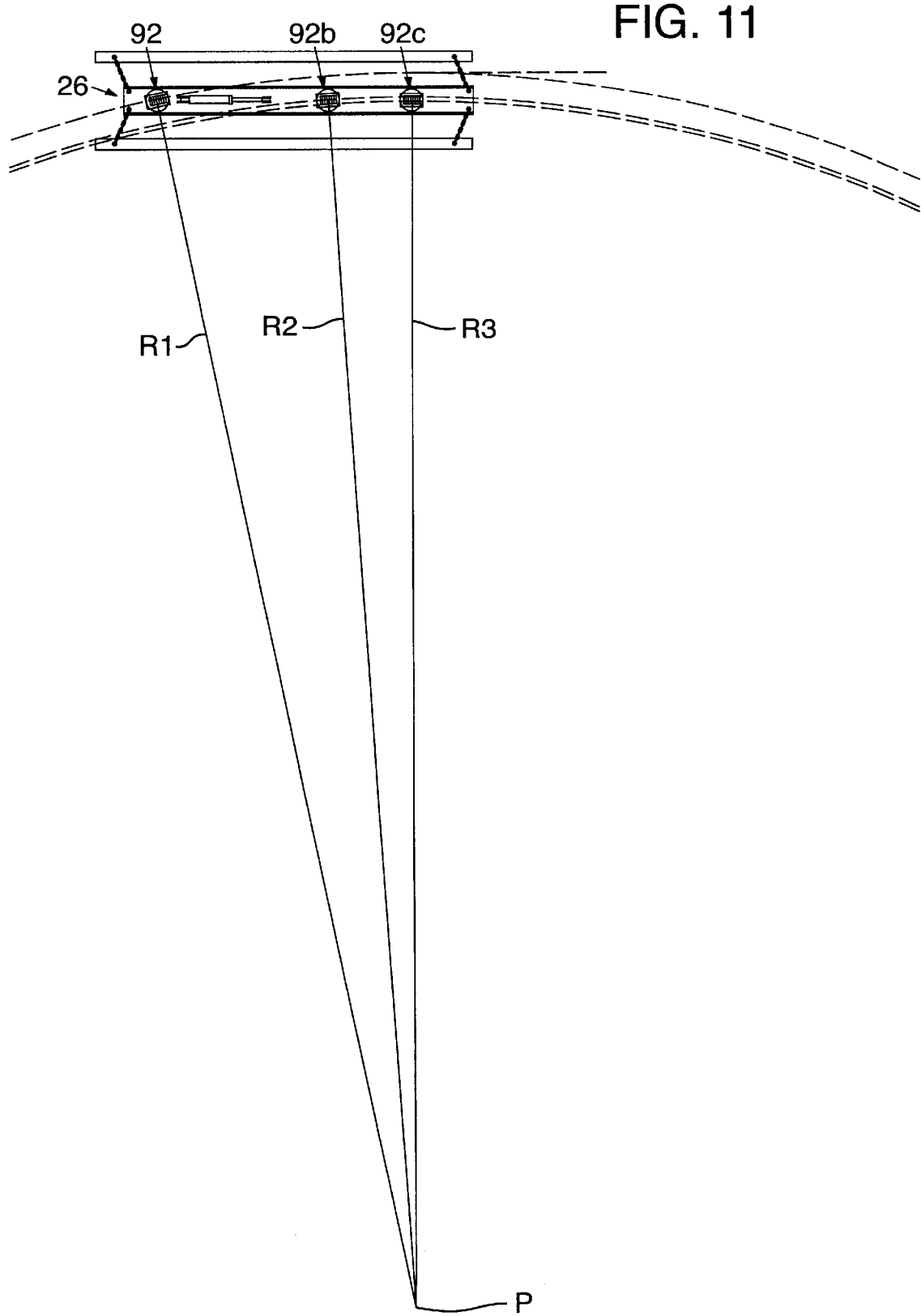

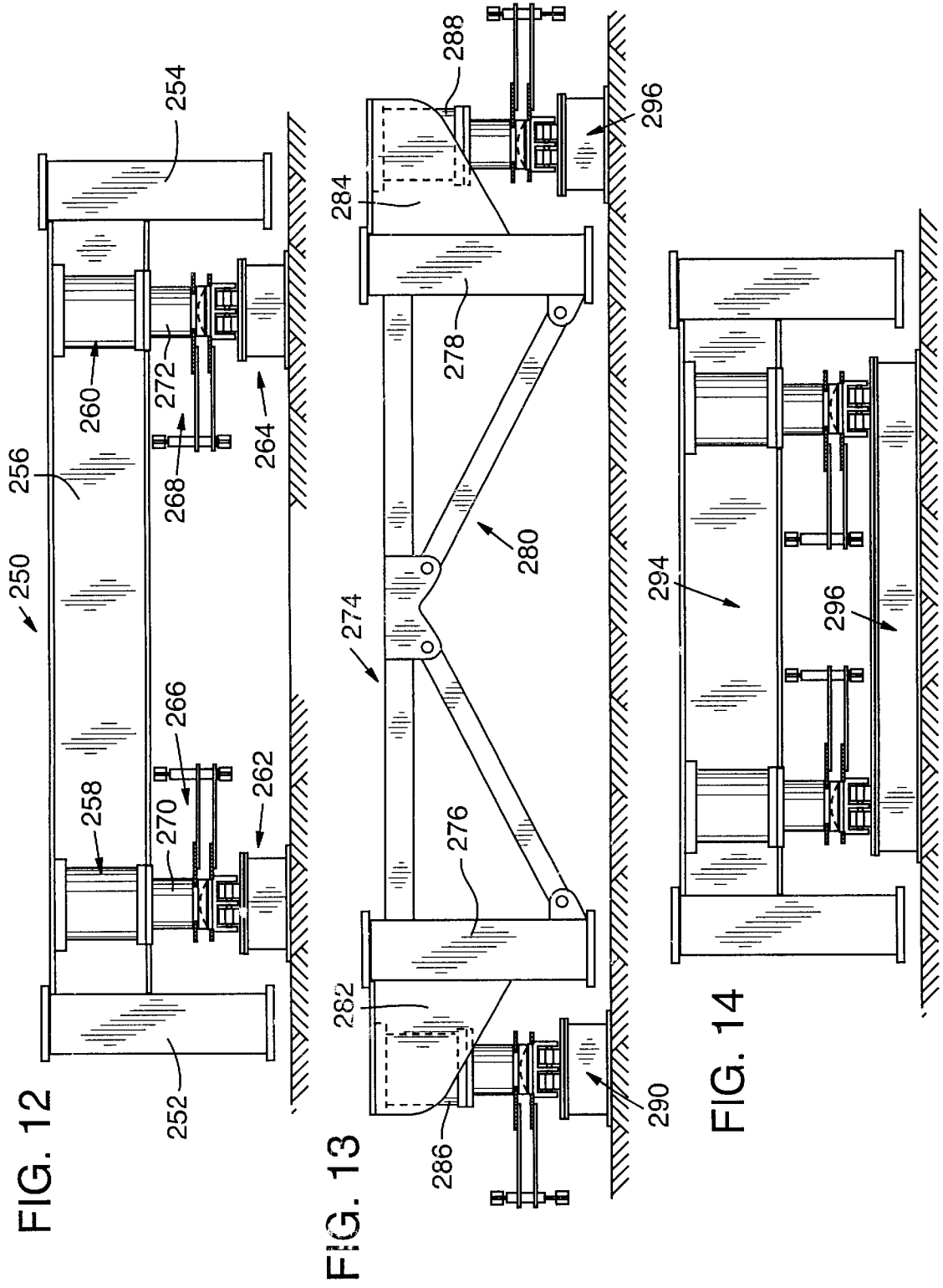

METHOD AND APPARATUS FOR TRANSPORTING AND STEERING A LOAD

BACKGROUND OF THE INVENTION

The present invention relates to that class of vehicles commonly referred to as "walking machines," which are large, non-wheeled power-driven structures operable for transporting massive and heavy loads, upwards of several thousand tons, over a surface, such as the ground, snow, a prepared gravel area, etc. These machines, massive and heavy substructures in themselves, are fabricated from iron and steel, and find particular utility in carrying and sequentially transporting huge structures such as oil drilling rigs to position them over pre-drilled conductor pipes installed into the ground prior to drilling well bores in a new field undergoing exploration for oil, or over existing well bores in old fields previously worked, as the case may be.

In particular, the method and apparatus of the present invention are directed to a novel system for sequentially transporting and steering a drilling rig and an accompanying service module, while substantially maintaining their relative positions, over an area in which multiple conductor pipes have been pre-drilled. The drilling rig and service module are each selectively transported and steered, if necessary, so that the drilling rig's derrick is precisely aligned over a selected conductor pipe. Steering is accomplished by operators of the substructures which carry the drilling rig and service module coordinating the relative movements of their machines.

PRIOR ART

There are numerous examples of so-called walking machines which have been designed for use in moving drilling rigs over well bores which have been drilled in an area of oil exploration. An example of a known walking machine is disclosed in U.S. Pat. No. 5,921,336 issued to Reed in which a drilling rig substructure is provided with a plurality of lifting jacks, and each lifting jack is connected to a jack pad. Roller assemblies are mounted at the lower end of the lifting jacks and each jack pad has a center beam that the roller assemblies engage. The jack pads are rotatable in 360° about a vertical axis. A push-pull mechanism extends between each jack pad and each roller assembly to move the rollers horizontally in relation to the jack pad. In operation, when it is desired to move to a well bore, the lifting jacks are extended, forcing the jack pad against the ground. Continued extension causes the upper end of the lifting cylinder to raise the substructure and accompanying drilling rig to move from ground level. The lifting jacks now remain in the extended position and the push-pull mechanisms are then actuated to move the substructure in a given direction. The lifting jacks are then retracted so that the substructure returns to the ground and the jack pad is then raised and moved to a new position.

SUMMARY OF THE INVENTION

The present invention is directed to a method and apparatus or substructure for transporting heavy machinery or equipment from one location to another, and more particularly to an apparatus which can be moved along a straight line or also steered. The apparatus can be steered so that it is displaced to align or orient equipment such as a drilling rig, precisely above a well bore.

It is conventional for an oil company or driller, drilling for oil, to install a row of "conductor" pipes, approximately ten feet apart, each conductor pipe extending down to a shallow depth usually 100 to 200 feet. When a drilling rig is positioned over a conductor pipe, and drilling commences, the drill will bore into the ground 8,000 feet or more to drill for oil. After the well is completed, the drilling rig is moved to the next conductor pipe, approximately ten feet away, and drilling commences again. While care has been taken initially to align the series of conductor pipes along a common line, they nonetheless can be offset from the line, sometimes as much as six inches. It is then necessary to adjust the location of the drilling rig to precisely align it over sequential conductor pipes.

The present invention provides a method and apparatus in which a substructure, supporting a drilling rig on a surface, may be lifted, shifted, and displaced from one conductor pipe to another, and, if necessary, steered into precise position over a conductor pipe. The present invention provides a steering mechanism, and also provides a construction in which a pair of substructures, one serving as a platform for the drilling rig and the other for a service module, can be moved, and steered, so that their relative positions are maintained. The service module, supported on a substructure separate from that of the drilling rig, provides the necessary auxiliary equipment for the drilling rig. This equipment includes engines, pumps, motors, pipe storage, fuel, and mud pumps, to name a few, necessary for operating the drilling rig. The service module is interconnected with the necessary hoses, pipes, electrical conduits, etc. to the drilling rig. The service module and drilling rig each have an operator's cab, so that the operators of these two massive modules can control the necessary positioning of their respective substructures and loads. The drilling rig and service modules can together weigh upwards of 4–5,000 tons.

Because the method and apparatus for transporting the drilling rig and service module include similar substructures, lifting assemblies, and steering mechanisms, a summary of just the method and apparatus for transporting and steering the drilling rig will be set forth. A substructure for carrying the drilling rig includes a pair of spaced-apart frame structures, or main beams which support the drilling rig above the ground or surface. Extending through a central region of each of the main beams is an elongate track member or sub beam which is positioned on the surface, and upon which a main beam, when lifted, will be rolled along. Each sub beam is provided with a planar upper face, and a plurality of lift assemblies are mounted on the main beams directly above their respective sub beams. Each lift assembly includes a hydraulic cylinder rigidly mounted on the substructure and connected to a hydraulic pressure unit and controls operable for extending and retracting its associated ram. Mounted on the end of each ram is a roller assembly which includes a roller frame carrying a plurality of rollers, rotatable around a horizontal axis. Each of the roller assemblies is mounted for selective rotation about a vertical axis, and a steering arm, connected to a steering mechanism mounted on the main beam, is operable to selectively rotate the roller assembly and its roller frame about the vertical axis so that the rollers may be oriented to a preselected angle relative to the longitudinal axis of a sub beam. Connected to each sub beam is a shifter mechanism which is also connected to a main beam and is operable to shift the main and sub beams relative to one another.

Initially, it will be assumed that the drilling rig is to be translated or moved rectilinearly, i.e., on a straight line of travel. The main beams of the substructures are positioned on the ground, and the lifting assemblies have been actuated so that their rams are retracted, disengaging the roller assemblies and their rollers from the sub beams. The shifter mechanisms, which include a travel cylinder connected between the main beam and the sub beam, are actuated to extend its rod so that the sub beam is pushed rectilinearly in the direction of travel. The lifting cylinders are then actuated to extend their associated rams so that the rollers engage the upper face of the sub beams. The rams are further extended so that the main beams and their load are raised above the surface and supported on the rollers and the sub beams. The travel cylinders are then retracted to displace the main beams in the direction of travel, with the main beams being rolled along the upper face of their respective sub beams, and supported thereon. The lift cylinders are then actuated to retract their respective ram to lower the main beams to the ground, and then to disengage the rollers from the sub beam. This basic method can be repeated, to move the drilling rig in repeated cycles a distance equal to the stroke of the travel cylinder, or less, if that is required. An operator can position a drilling rig over a selected conductor pipe relatively precisely, assuming that the conductor pipes are laid out on a straight line, and that the drilling rig does not have to be steered. However, in many situations the rig does in fact require steering.

It is common that conductor pipes have not been precisely laid out on a common line, but are offset, and the method and apparatus of the present invention provides a steering mechanism enabling an operator to steer accurately the drilling rig into position over a selected conductor pipe. The operational sequence is generally as follows. With the travel cylinders fully extended, the main beams supported on the ground and the lifting cylinders fully retracted, the operator determines how much the main beams need to be steered to travel to the correct position over a conductor pipe.

The steering arms are positioned to set the roller assemblies and their frames at a predetermined angle relative to the longitudinal axis of the sub beams, and the lifting cylinders are then actuated so that the rams are extended to engage the sub beams such that the rollers make an angle relative to the sub beams' longitudinal axes. The lifting cylinders are further extended to raise the main beams off the surface and the shifter mechanism is then actuated, moving the main beam on the rollers at an angle relative to their associated sub beams. There are multiple lifting cylinders which are interconnected by a linkage system, so that the roller frames can be preset at different angles relative to the longitudinal axis of a sub beam. Depending how the operator selects orientation of the rollers relative to the longitudinal axis, the main beams may be displaced straight ahead, with no steering, or the operator may choose to direct the main beams in so-called simple steering, crab steering, or complementary steering modes. These will be further described below with reference to the preferred embodiments of the invention.

BRIEF DESCRIPTION OF THE DRAWINGS

FIG. 2A is a sectional view taken along lines 2A—2A of FIG. 1, and shows, in top plan view, the present invention used to steer and carry the drilling rig;

FIGS. 4A, 4B, 4C and 4D are side elevational views taken along lines 4A—4A of FIG. 2A and show, in sequence, the raising of a main beam of the substructure above the surface, moving the main beam along a track member or sub beam, lowering the main beam back on to the sub beam, and displacing the sub beam in the direction of travel of the main beam;

FIG. 5E is a view similar to FIGS. 5D and 5E, and shows the steering assembly when the steering arm has been rotated −12°;

FIG. 9 is a top plan view of an alternative arrangement of the lift assemblies interconnected by a series of rods and links;

FIG. 10 is a top plan view of the main beams and steering assembly of the apparatus used to move the service module;

FIG. 11 is a schematic view of the motion of the roller assemblies in simple steering along the sub beam used adjacent a main beam of the drilling rig; and FIGS. 12, 13 and 14 illustrate alternative embodiments of a substructure using different main beam and sub beam arrangements in accordance with the present invention.

DETAILED DESCRIPTION OF THE PREFERRED EMBODIMENTS

As stated at the outset, the present invention is directed to a novel method and apparatus for transporting and precisely steering heavy loads along a surface to position the load accurately at a predetermined location. The present invention finds particular applicability to transporting and steering a drilling rig and its accompanying service module so that the drilling rig can be moved along a line of conductor pipes and positioned over a selected conductor pipe so that its drill can be accurately inserted into a conductor pipe to drill for oil far beneath the surface.

Figure 1:
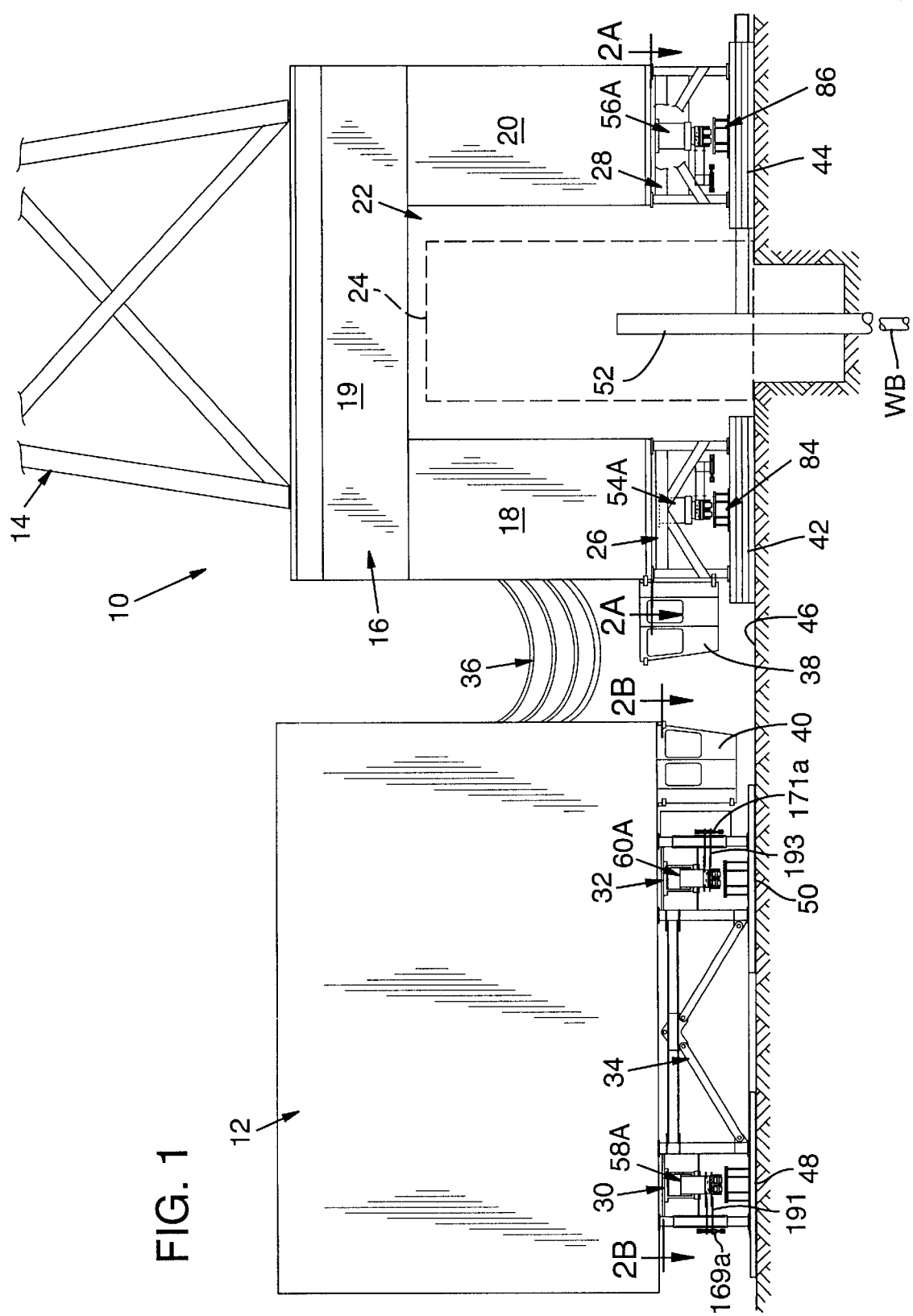
FIG. 1 illustrates an end elevational view of a drilling rig and an associated service module equipped with the steerable, load-carrying apparatus of the present invention.

As shown in FIG. 1, an oil-drilling rig is generally indicated at 10 and its accompanying service module is generally indicated at 12, each supported on its own, independent and steerable, load-carrying apparatus or substructure, in accordance with the present invention. The drilling rig includes a derrick or mast 14 supported on a module 16 which includes two vertical sections 18 and 20 spaced-apart and interconnected by a horizontal or bridging section 19, to provide an opening 22 to accommodate a well house 24, which may rise some 15 feet or more. The well house is shown in dashed lines because it may or not, be present depending on application.

Drilling rig 10, which can weigh 1,500 tons or more, is supported on a pair of opposed, spaced-apart substructures or main beams 26 and 28, which, when viewed in plan (see FIG. 2A), may extend 45 feet or more. Main beams 26, 28 are connected to one another by vertical sections 18 and 20 and bridging section 19 (See FIG. 1). Service module 12, weighing approximately 3,000 tons, is carried by a pair of opposed, spaced-apart substructures or main beams 30 and 32 connected to one another by bracing such as k-braces generally indicated at 34. The service module includes engines, pumps, motors, pipe storage, mud storage, a hydraulic pressure unit, and other controls necessary for its own operation and that of drilling rig 10. Generally indicated schematically at 36 are a plurality of hoses and pipes interconnecting the drilling rig and service modules. Also shown are operator cabs for the drilling rig and service module, indicated at 38 and 40, respectively.

Main beams 26 and 28 rest on a series of stacked mats 42 and 44, respectively, to elevate them above surface 46, which may be for example, the ground, snow, ice, or a gravel bed, prepared by a crew in anticipation of drilling and the need for a relatively level surface. Mats 42 and 44 are stacked so that main beams 28 and 30 are elevated for travel above flow lines 51 extending horizontally from the well bores. The flow lines transfer oil from a well bore to a pipe rack and then to a pipeline.

Main beams 30 and 32 are also mounted on a series of mats, such as single-layer mats 48 and 50. The mats underlie the main beams to provide a level travel surface, and to more evenly distribute the massive loads from the drilling rig and service modules. A well bore is shown at WB, and a conductor pipe at 52. No other drilling equipment is shown because it is conventional.

Main beams 26, 28 and 30, 32 are each provided with steerable lift assemblies, operable for lifting the main beams and raising them with their corresponding loads above the surface for support on a structural track member or sub beam. Prior to raising the main beams, the lift assemblies are oriented or preset so that they will travel along the longitudinal axis of the sub beam or set at an angle, to provide steering. Once raised, the main beams are displaced by being rolled along their sub beams, either straight ahead or steered, depending on how the lift assemblies were preset, in the direction of a selected conductor pipe or other area.

Figure 2B:
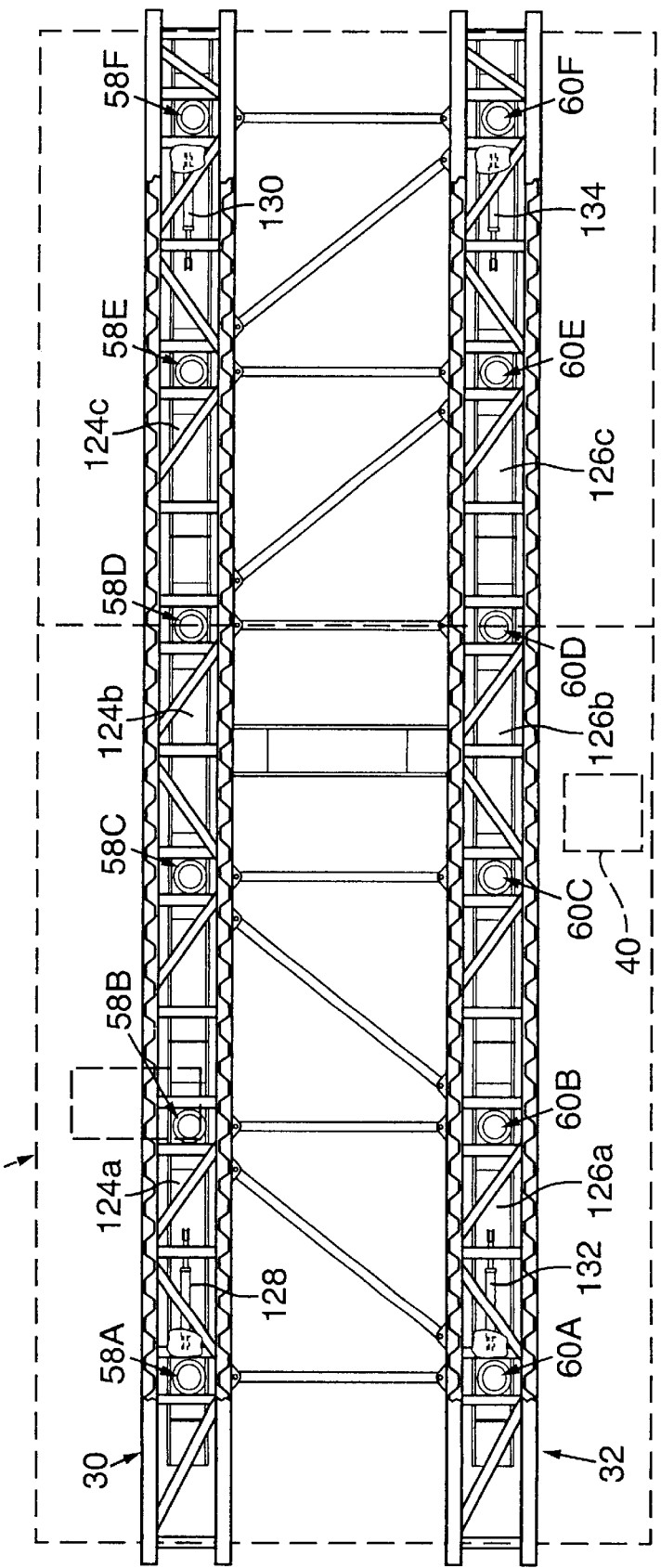
FIG. 2B is a sectional view taken along lines 2B—2B of FIG. 1 and illustrates, in top plan view, the present invention used to steer and carry the service module.

As shown in FIG. 2A, main beam 26 is provided with lift assemblies 54A, 54B and 54C, while main beam 28 is provided with lift assemblies 56A, 56B and 56C. As shown in FIG. 1, main beams 30 and 32 are provided with steerable lift assemblies 58A and 60A, and FIG. 2B, which is a top plan view of the substructure for carrying the service module, illustrates mounting of six steerable lift assemblies 58A–58F on main beam 30 and six steerable lift assemblies 60A–60F on main beam 32. The mounting of the lift assemblies is similar on all the main beams, and a more detailed description of the main beams, the sub beams and the mounting of the lifting assemblies will be described now with reference to main beams 26 and 28. Main beams 30 and 32 are similar but longer, and carry 12 steerable lift assemblies. More lift assemblies are needed on main beams 30 and 32 because of the heavier weight of the service module, i.e., approximately 3,000 tons.

As shown in FIG. 2A, main beam 26 is formed with a pair of laterally spaced-apart corrugated walls 62 and 64. Top flanges are shown at 66 and 68 which are joined to and extend along the top of walls 62, 64, respectively, and provide part of the base or platform for carrying the drilling rig. A series of struts and diagonal braces are indicated at 70 and 72, and a top plate 74 (shown in cutout in FIG. 2A, and see FIG. 3A) extends between walls 66 and 68 and functions as a girder or support for the mounting of steerable lift assemblies 54A–54C.

Main beam 28 is constructed similarly to main beam 26, and as shown in FIG.2A, laterally spaced-apart walls 76 and 78 include top flanges 80 and 82, respectively. The struts between walls 76, 78 are not shown in FIG. 2A but are essentially the same as shown with respect to main beam 26. Each main beam when lifted is supported on an adjacent structural track member or sub beam—for example, as shown in FIGS. 1 and 2A, a sub beam generally indicated at 84, is positioned on the mats in the central region of main beam 26. The sub beam is disposed directly beneath and laterally midway between lift assemblies 54A–54C, each sub beam is constructed with a substantially planar upper face, such as indicated at 85 for sub beam 84 and at 87 for sub beam 86 and is dimensioned to extend the length of the main beam, approximately. Similarly, sub beam 86 is positioned beneath lift assemblies 56A–56C.

The Lifting Mechanism and Rectilinear Shifting

Figure 5C:
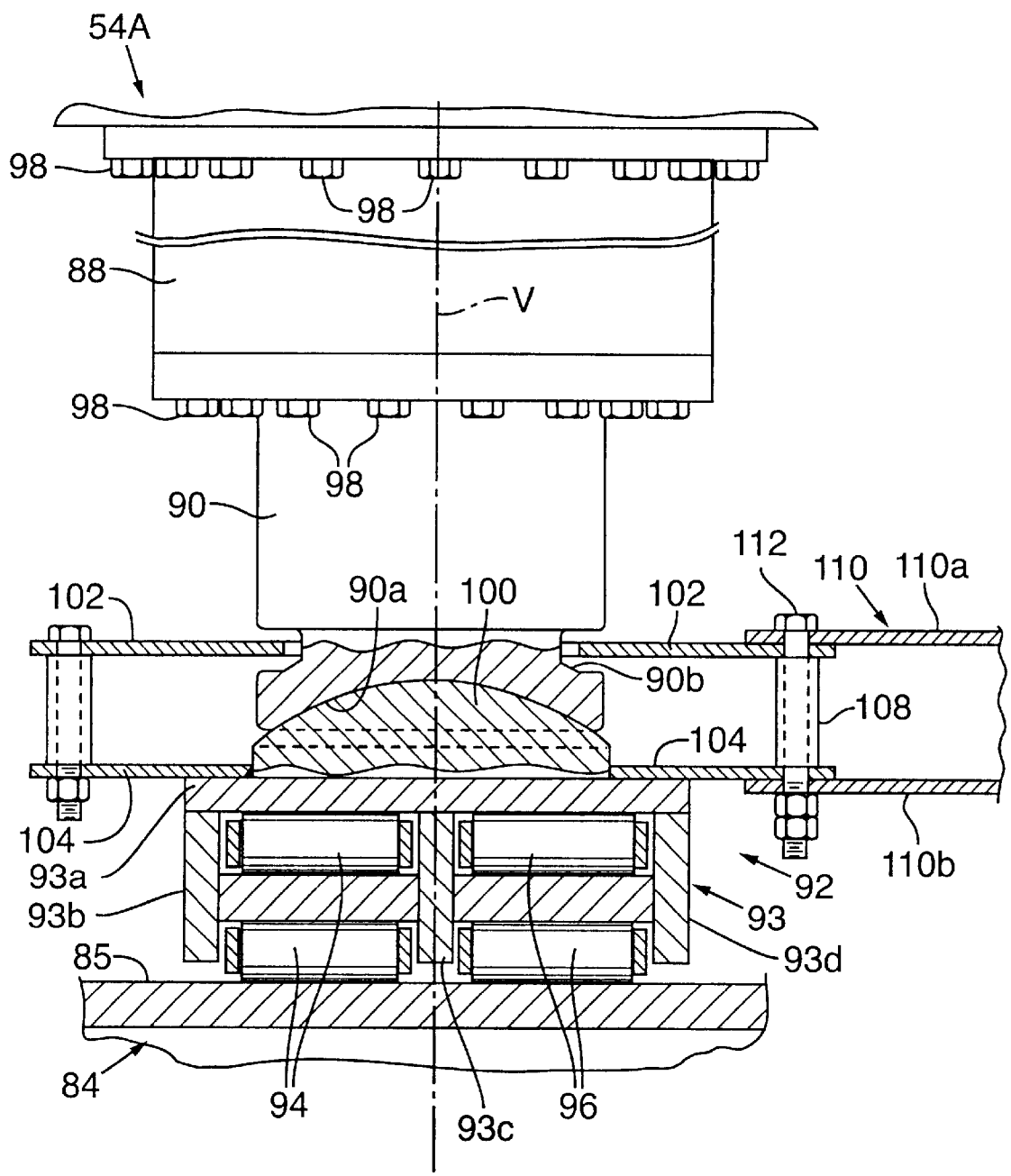
FIG. 5C is a view taken along section 5C—5C of FIG. 5D, and show details of the mounting of a steering assembly on the end of an extendible-retractable ram in accordance with the present inventions.

The description of the steerable lift assemblies will focus principally on a description of lift assembly 54A, as shown in FIGS. 3A and 5A–C, because all the lift assemblies and their components are essentially identical. FIGS. 5A and 5B show that lift assembly 54A includes a hydraulic cylinder 88 operable for selectively extending or retracting a ram 90. (The hydraulic power unit or HPU and hoses, controls, valves, etc. are not shown as they are conventional.) Mounted on the end of ram 90 is a roller assembly 92 which can be selectively actuated by a steering arm to rotate or pivot about a vertical axis V extending through the center of ram 90 and cylinder 88. The roller assembly 92 includes a roller frame 93 having an upper plate 93a and spaced apart walls 93b–d (see FIG. 5C) which mount pairs of endless chains of individual rollers 94 and 96. Both the drilling rig and the service module employ lift cylinders with 22-inch diameter, 10-inch stroke rams, and the rollers are 500-ton capacity Hilman rollers.

Figure 3A:
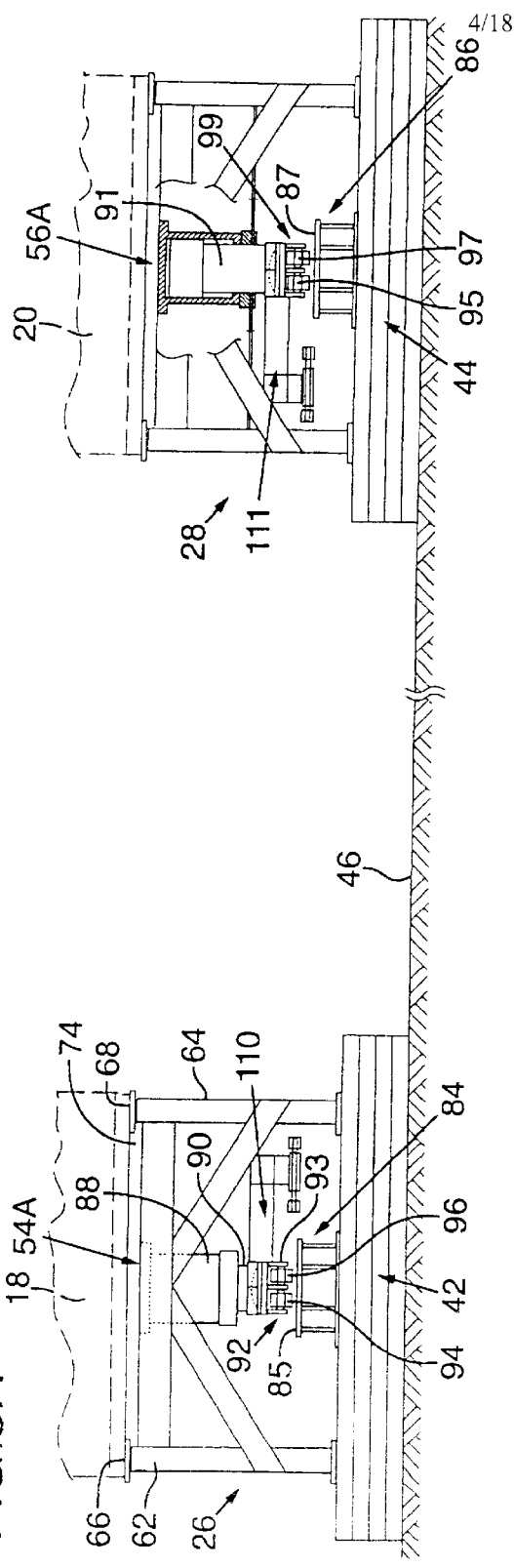
FIGS. 3A and 3B are an end view of the apparatus of the present invention used to carry the drilling rig, and illustrates the raising and lowering of the drilling rig in accordance with the present invention.

As shown in FIG. 3A, cylinder 88 of lift assembly 54A is secured to upper plate 74 by circumferentially positioned bolts 98 (see also FIG. 5A). Ram 90 is configured with a hemispherical or concave lower expanse 90a formed to rotatably journal a spherical button or bearing 100 rigidly connected to upper plate 93a so that the roller frame can be rotated about vertical axis V. That enables the rollers, such as shown at 96 in FIG. 5A, to be selectively positioned for moving along the longitudinal axis of sub beam 84 or at an angle relative to that longitudinal axis, to be described in detail at a later point.

Roller frame 93 is connected to ram 90 for rotatable and vertical movement relative thereto by a pair of spaced-apart plates, such as upper and lower brackets 102 and 104, respectively. Upper bracket 102 is formed with a circumferential aperture defined by a rim 102a which is dimensioned to surround and fit within a circumferential groove 90*b* formed on the end of ram 90. Lower bracket 104 is suitably welded to button 100, and brackets 102 and 104 are rigidly connected together by a plurality of bolts 106 threadably secured to plate 93*a* and spaced-apart by sleeves 108.

As shown in FIG. 5A, when ram 90 is retracted, the bottom of groove 90*b* will engage the lower surface of upper bracket 102 so that the roller frame assembly is raised or lifted as a unit, to disengage the rollers from upper face 85 of sub beam 84. When the ram is extended, as shown in FIGS. 5B and 5C, groove 90*b* accommodates movement of the roller frame relative to the ram, as rollers 94 and 96 engage upper face 85, so that spherical expanse 90*a* conforms to receive and exert uniform pressure on button 100. Of course the hemispherical shapes of expanse 90*a* and button 100 define a rotatable journal, when the roller assembly is lifted above upper face 85 as shown in FIG. 5A.

FIG. 5C illustrates a portion of the arrangement of a steering arm, generally indicated at 110, which is pinned to upper and lower brackets 102 and 104 by a bolt 112, with a spacer shown at 108. The steering arm is pivotal about an axis extending through bolt 108, but another member, not shown in FIG. 5C, which will be discussed later, enables the steering arm to selectively rotate roller frame 93 about vertical axis V when the roller frame is in a raised position as shown in FIG. 5A.

Figure 3B:
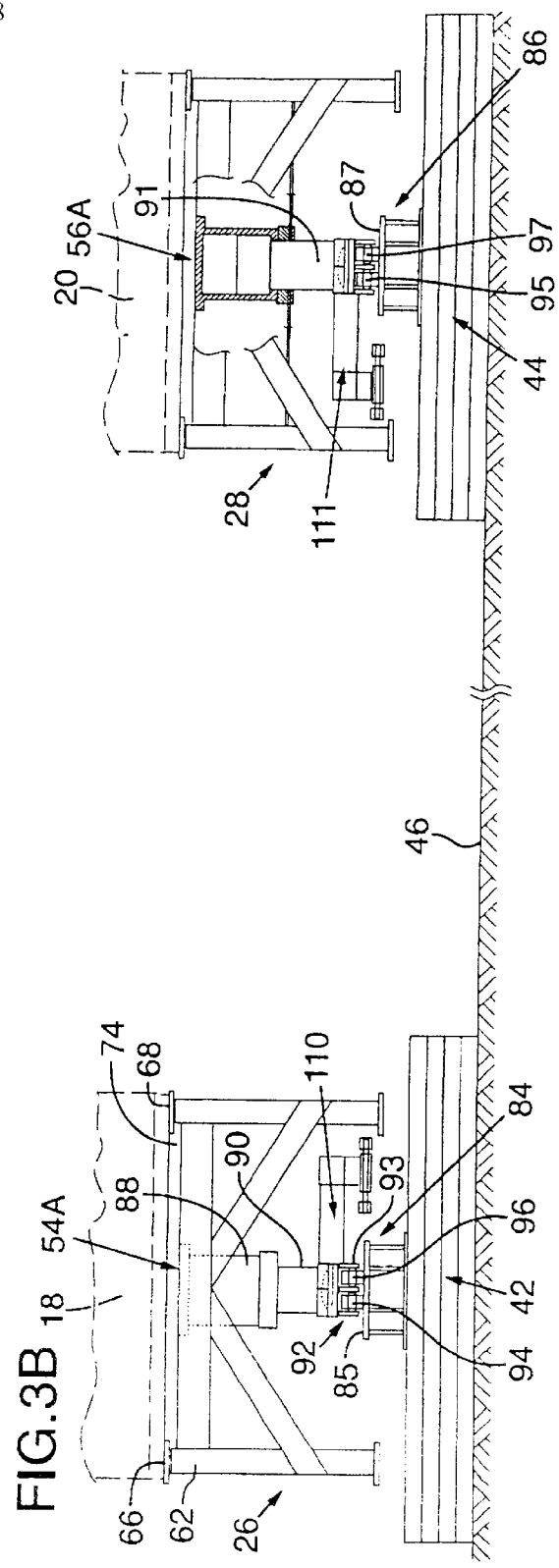

FIG. 3A shows main beams 26 and 28 positioned on the surface, in this case, mats 42 and 44, respectively, to carry the load of the drilling rig. In this position, lift assemblies 54A and 56A have been actuated to retract their respective rams 90 and 91 so that the main beams are supported on the mats and in turn, on surface 46. As shown in FIG. 3B, upon extension of rams 90 and 91, rollers 94, 96 of main beam 26 and a set of rollers 95, 97 of main beam 28 engage sub beams 84 and 86, respectively. It will be assumed that steering arm 110 and a steering arm 111 connected to a roller assembly 99 are oriented so that their respective rollers will be directed to travel down the longitudinal axis of the sub beams.

When the rams are further extended, the main beams are lifted from the surface (or mats as the case may be) and the entire load of the drilling rig and the main beams is now carried on the two sub beams 84 and 86. The main beams are now in a position to be displaced by rolling them along the sub beams to a selected spot, to locate the drilling rig over a selected conductor pipe, for example. Initially, how the system operates in straight line or rectilinear translation down the longitudinal axes of the sub beams will be described, and then the steering action will be set forth. Straight line translation or displacement can be best appreciated from a consideration of FIGS. 4A–D, a side view taken along lines 4A—4A of FIG. 2A, which shows only one wall 62 of main beam 26 and its adjacent sub beam 84. The steps of displacing main beam 26 apply to main beam 28, as the sequence occurs simultaneously with that of beam 26, and so only a discussion of the movement of main beam 26 and sub beam 84 follows.

The three lift assemblies, 54A, 54B and 54C are shown mounted to top plate 74 by means of mounting brackets, and a shifter mechanism, generally indicated at 114, includes a hydraulic travel cylinder 116 and an extendable-retractable rod 118, operable for shifting the main and sub beams relative to one another. As this description proceeds, it will be noted that during a travel sequence, the sub beam is never disengaged or lifted from the surface on which it is positioned; it is either positioned at rest on the surface, in this case the mats, or is slid therealong by operation of the travel cylinder.

Travel cylinder 116 is connected by means of a spherical bearing 120 to a bracket 122 which in turn is rigidly secured to plate 74. The exterior end of rod 118 is connected by a spherical bearing 123 to sub beam 84. The spherical bearings permit the ends of the travel cylinder and rod to swing or move laterally or vertically relative to the main and sub beams, an important feature when moving and steering action takes place.

As shown in FIG. 4A, the lift assemblies have been actuated so that their respective rams are retracted, and the rollers are disengaged from the sub beam. Assuming that the steering arms are oriented in a neutral position so there is no rotation of the roller assemblies about their vertical axes, the rollers will be aligned to travel down the centerline or longitudinal axis of sub beam 84. Ram 90, and the rams of lift assemblies 54B and 54C are now extended toward the surface until the rollers engage upper face 85, and further extension of the rams raises the main beam from being supported on the surface, as shown in FIG. 4B, and the total load is now carried solely by sub beam 84 and the rollers.

To displace main beam 26 along the sub beam, travel cylinder 116 is actuated to retract rod 118, as shown in FIG. 4C, and that pulls main beam 26 so that it rolls on the roller or the roller assemblies along upper face 85 of sub beam 84, to the right. Next, the lifting assemblies are operated so that their respective rams are retracted, to lower main beam 26 back onto the surface, and upon further retraction, the rollers in the roller assemblies disengage from upper face 85 of the sub beam. As shown in FIG. 4D, cylinder 116 is now actuated to extend rod 118 and that causes sub beam 84 to be pushed over the surface to the right, to a start position prior to the cycle being repeated, if required. Sub beam 84 includes sloped sections or bevels 125 at each end, to facilitate relatively smooth travel over the surface, either to the left or right, under normal surface conditions.

As mentioned previously, the length of the main beams of the substructure, for a drilling rig, may be in the range of 45 feet, with the sub beams being about that length or slightly shorter. Because of the massive weight and stresses placed upon the moving parts of the system, the main beams are moved relatively slowly, i.e. in the range of about four feet per minute, as the operator in the cab controlling travel of the drilling rig must coordinate speed and direction with the operator of the service module, which follows along, maintaining the relative positioning of the two modules. It has been found that a stroke of about 44 inches for a 10-inch bore travel cylinder optimizes the travel distance for a cycle in which a roller assembly may move at an angle across the sub beam, which is dimensioned approximately three and a half feet wide.

With respect to the service module, and use of travel cylinders on its substructure, it will be seen in FIG. 2B that travel cylinders 128, 130, 132 and 134, are located at opposite ends of the sub beams. There are a total of three linked sub beam sections 124*a*, 124*b* and 124*c* and three linked sub beam sections 126*a*, 126*b* and 126*c* mounted on the surface (or mats) adjacent main beams 30 and 32, respectively. The length of a service module may be in the range of 135 feet, requiring long sub beams and travel cylinders mounted adjacent ends of the outermost sub beams. As shown in FIG. 2B, travel cylinders 128 and 130 are mounted on sub beam sections 124*a* and 124*c*, respectively, and travel cylinders 132 and 134 on sub beam sections 126*a* and 126*c*, respectively.

The travel cylinders are mounted with spherical bearings, similar to that shown for the arrangement for main beams 26 and 28. However, the travel cylinders on a common sub beam are connected in a mirrored arrangement and thus move in opposition to one another in a travel sequence. For example, to move main beam 30 when it is supported on sub beams 124a–c to the right, in the view of FIG. 2B, travel cylinder 128 is retracted at the same time travel cylinder 130 is sequenced to extend. The lift assemblies, such as shown at 58A–F and 60A–F are substantially identical to lift cylinder 54A and the others on main beams 26 and 28.

The Steering Mechanism and Operation

One of the principal features of the present invention is the ability of the substructures carrying the drilling rig and the service module to be steered or turned to position the drilling rig so that the mast and drill can be aligned precisely over a well bore. Because the two systems, i.e. the drilling rig and service module, are interconnected, they must maintain their relative positioning, and the main beams on both units must travel at essentially the same rate and be steered approximately along the same direction. Steering is accomplished in a unique manner which is essentially the same for both the drilling rig and the service module, with the principal difference being the number of steerable lift assemblies provided on each. More steerable lift assemblies are provided on the service module because it is much larger and more support must be provided during the lifting and transport phases.

Figure 6A:
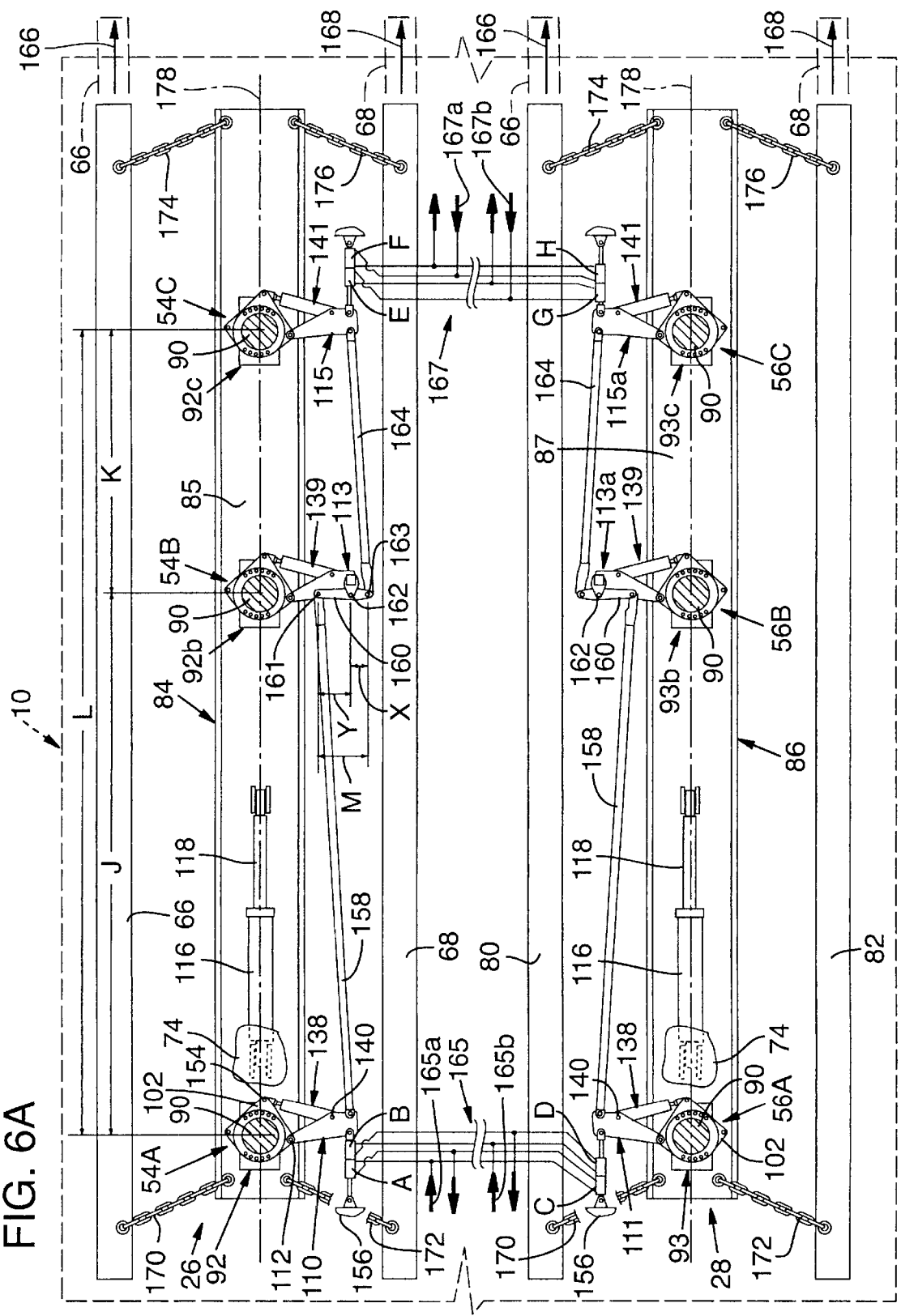
FIG. 6A is a top plan view of the main beams of the substructure used to support the drilling rig, and illustrates the apparatus prior to displacement and steering of the main beams.

To simplify the description, attention is directed to the steering mechanism as it is incorporated for the substructure which carries the drilling rig, and more particularly to the construction which enables steering of main beams 26 and 28 as they are supported on their respective sub beams 84 and 86 during travel. A description of the steering mechanism, for three different modes of steering will be set forth. The first is simple steering, the second is so-called "crab" steering, and the third is complementary steering. Simple steering will be described with reference to FIGS. 6A–D, and reference will also be directed to FIGS. 5D and 5E. FIG. 6A is a schematic showing main beams 26 and 28 positioned closer together for purposes of explanation.

For accurate and precise steering to be accomplished, the steering or turning of main beams 26 and 28 must be synchronized. To provide that steering a series of links interconnect lift assemblies 54A–C and 56A–C. Each of the lift assemblies has a steering arm and since they are substantially identical, the steering arm and a force-absorbing link, as they are incorporated on lift assembly 54A will be described, understanding that the construction of the other steering arms and force-absorbing links are substantially identical.

Figure 5F:
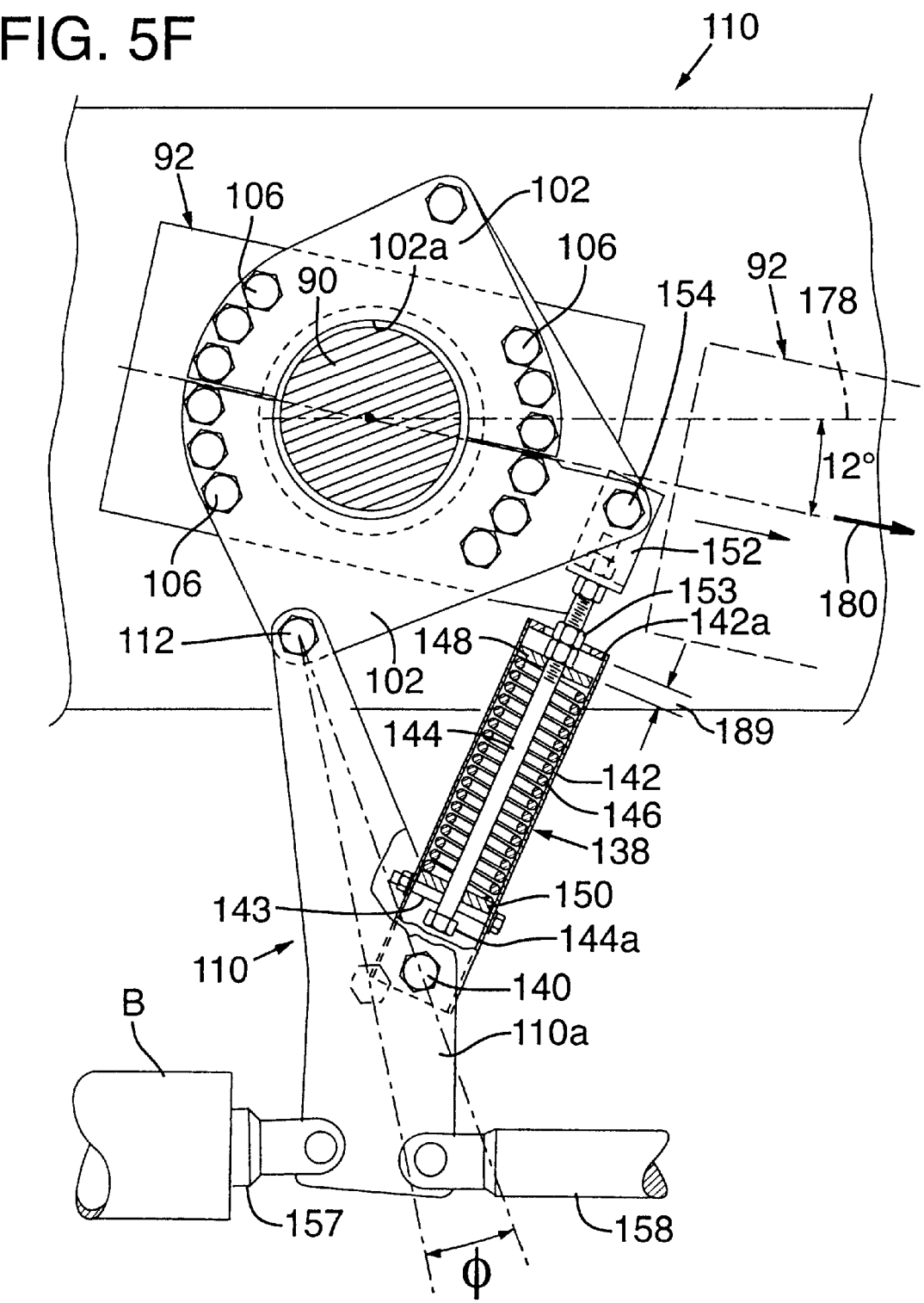
FIGS. 5A and 5B are views taken along section 5A—5A.
FIGS. 5D and 5E are views taken along section 5D—5D of FIG. 4B, and shows details of the steering assembly when the steering arm has been rotated +12°, and a force-absorbing spring cartridge assembly.

As shown in FIG. 6A, the steering mechanism includes a steering arm 110 pivotally connected to upper and lower brackets 102 and 104 by bolt 112 (see FIGS. 5C and 5D also). The enlarged view of FIG. 5D shows that angled steering arm 110 is connected adjacent its bend by a bolt 140 to a force-absorbing link such as a spring cartridge assembly, generally indicated at 138. The cartridge assembly includes a cylinder 142, and an elongate, adjustable bolt 144 extends through the center of a coil spring 146 mounted in the cylinder. Washers 148 and 150 are mounted at opposite ends of coil spring 146, and bolt 144 is provided with a head 144a which engages washer 150 when the assembly is placed under compression as shown in FIG. 5E. A pair of spaced-apart bolts 143 (one hidden) extend through cylinder 146 adjacent bolt 140 and limits the extent to which washer 150 and spring 146 may be extended as shown in FIG. 5F.

Elongate bolt 144 is connected to a rod coupler or bracket 152 for pivotal connection to a bolt 154 to upper and lower brackets 102 and 104, as seen in FIGS. 5A, 5C and 5D. The compression of spring 146 shown in FIG. 5E from its preloaded position show in FIG. 5D and compression of the spring in the opposite direction as shown in FIG. 5F will be described later.

Steering arm 110, as shown in FIG. 6A, is connected to a hydraulic cylinder actuating mechanism which includes stacked pairs of hydraulic cylinders A and B. The hydraulic cylinders are interconnected to main beam 26, as schematically represented by mount 156. Steering arm 110 is interconnected by an elongate push rod 158 which in turn is pivotally connected to a floating link 160 which in turn is pivotally connected at 162 to steering arm 113 of lift assembly 54B. Another elongate push rod 164 interconnects floating link 160 to steering arm 115 of lift assembly 54C. Link 160 is referred to as a "floating" link because it can pivot about pivot connection 162 and can move back and forth, depending on the action of the push rods. Each of lift assemblies 54B and 54C is provided with a spring cartridge assembly, such as shown at 139, 141, respectively, substantially identical to spring cartridge assembly 138. Hydraulic cylinders E and F are mounted to main beam 26, and like cylinders A and B, are interconnected to the main beam.

It will be noted that main beam 28 is provided with stacked pairs of hydraulic cylinders C and D operable for actuating steering arm 111 connected to lift assembly 56A, and hydraulic cylinders G and H are connected to the steering arm connected to lift assembly 56C. Lift assembly 56B is interconnected to its adjacent lift assemblies 56A and 56C in an arrangement similar to that provided on main beam 26, as can be seen from FIG. 6A. Hydraulic lines, generally indicated at 165, which form a hydraulic tie-rod, interconnect hydraulic cylinders A, B and C, D to a hydraulic power unit (HPU) and controls for receiving hydraulic fluid under pressure. While not shown, the hydraulic system for main beams 26 and 28 includes three zones of two lift assemblies each valved to three pumps. Two 40-horsepower electric motors drive dual pumps and three of the four pumps provide hydraulic fluid.

Hydraulic cylinders E, F and G, H are also connected to hydraulic lines, generally indicated at 167, and receive hydraulic fluid under pressure. In the arrangement shown in FIG. 6A, the roller frames on the lift assemblies have not been rotated and the system is set up for rectilinear translation along sub beams 84 and 86 to the right as shown by the arrows indicated at 166 and 168. In this neutral orientation of the steering arms, hydraulic fluid is directed through lines 165a and 165b to extend cylinders A and D, and cylinders B and C are retracted. On the right side, with respect to lift assemblies 54C and 56C, hydraulic fluid is pumped through lines 167a and 167b to extend cylinders E and H and retract cylinders G and F.

Figure 6B:
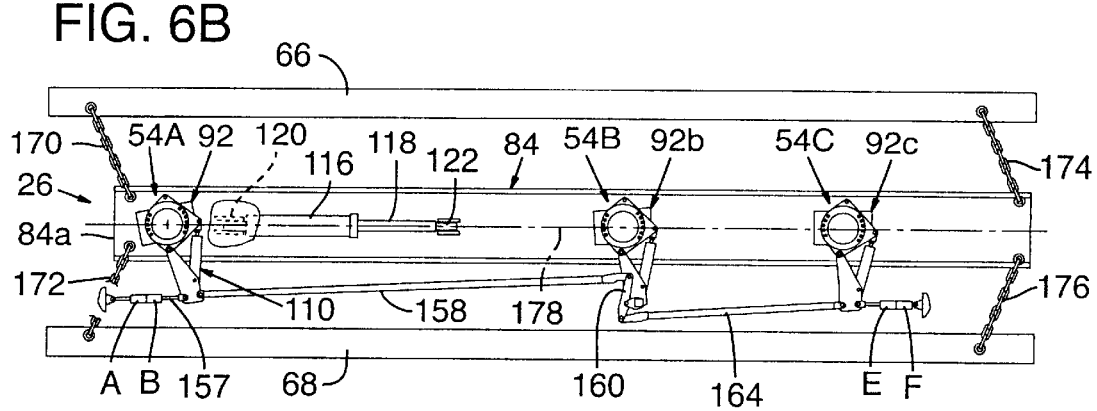
FIGS. 6B, 6C and 6D illustrate, in sequence, simple steering of one of the main beams used to carry the drilling rig and re-centering the sub beam after the main beam has been displaced.
Figure 6C:
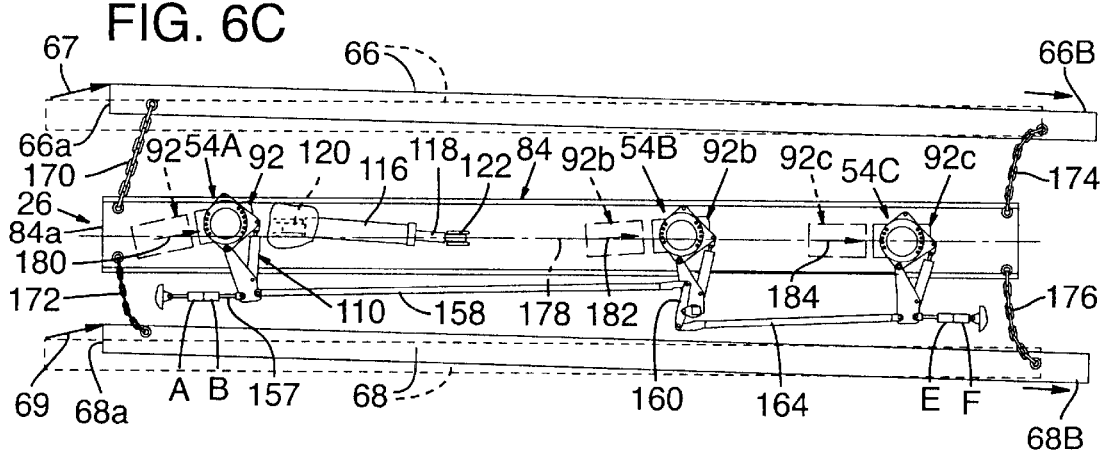
Figure 6D:
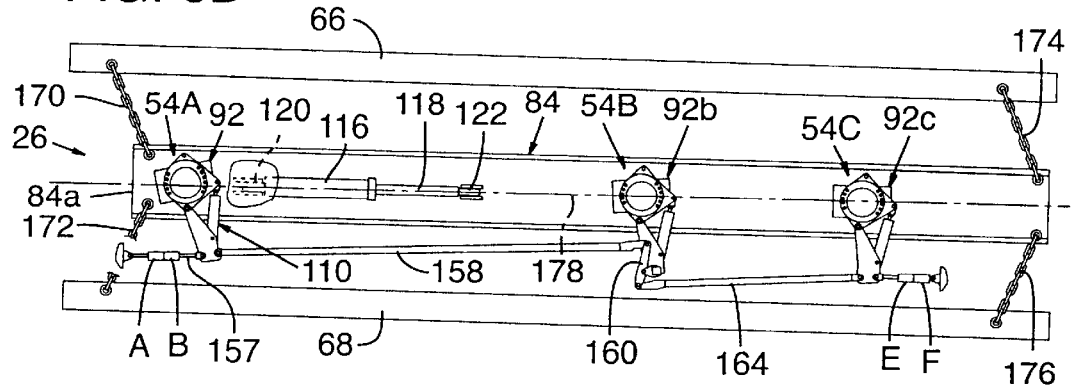

Each of the sub beams is interconnected by a set of heavy chains such as anchor chains, connected at the ends of the sub beams, to opposed walls of the main beams. Specifically, sub beam 84 is connected at its left end (as seen in FIG. 6A) by chains 170 and 172 and on the right end by chains 174 and 176 to main beam 26. A similar chain connection is shown for main beam 28. The chains provide a centering mechanism when the main beams are steered, as will be described. The anchor chains are the preferred structure for centering the sub beams on each step, and other structure can be used, such as guides or other connections. As shown in FIGS. 6B–D, a simple steering and centering sequence will be described. In these figures only the steering as it is applied to main beam 26 is shown because steering of main beam 28 is similar except that opposed hydraulic cylinders, such as A and C work in opposition to one another via the hydraulic tie rod construction.

Simple steering, in the context of the present invention, means steering the rear roller assembly 92 at an angle with respect to the longitudinal axis 178 while front roller assembly 92c is not set at an angle. Or conversely, the rear roller assembly 92 is not set at an angle relative to the longitudinal axis whereas front roller assembly 92c is set at an angle. In either case, intermediate roller assembly 92b is set at an angle different from the front and rear roller assemblies.

Initially, it will be assumed that is desired to provide simple steering to turn main beam 26 (and main beam 28, not shown) clockwise as it is displaced to the right. The sequence is generally as follows: First, the operators of the drilling rig and service module decide how far forward and to what degree a turn must be made to locate the drilling rig accurately over a conductor pipe, or to reach a desired location. In this example, it is assumed that steering will be principally provided by the roller assembly on lift assembly 54A, the rear roller assembly, assuming that main beam 26 is to proceed to the right with a gradual turn. The drilling rig rests on main beam 26 (and main beam 28, not shown) and the lifting assemblies are actuated so that their rams are retracted, and the main beams and their load are supported on the mats. As shown in FIG. 6B, hydraulic cylinder B is actuated to extend rod 157 a predetermined amount to rotate roller assembly 92 about vertical axis V in a counterclockwise direction, say 12°. While not shown in FIG. 6B, but in FIG. 6A, cylinder D would be simultaneously powered to retract its rod to rotate the roller assembly of lift assembly 56A counterclockwise also 12°. Thus, the roller assemblies of both lift assemblies 54A and 56A would be positioned to a predetermined angle, in this case 12°, for subsequent travel on their respective sub beams. This 12-degree angle is also shown in FIG. 5D.

It will also be noted in FIG. 6B that hydraulic cylinders E and F have not been changed from their initial neutral position whereby roller assembly 92c is still aligned for rectilinear translation. Because of the geometry of push rods 158 and 164 and their respective linkages, roller assembly 92b of lift cylinder 54B has been rotated approximately 33 percent of the rotation of roller assembly 92, i.e. about 4°. This relationship will be explained in greater detail below.

With the roller assemblies so positioned, the operator actuates the controls to extend the rams of the lift assemblies downward until the rollers engage the sub beams, such as sub beam 84 shown in FIG. 6B, and the main beams are now lifted with their load above the surface, so that the total load is transferred to and supported by the sub beams. Next, as shown in FIG. 6C, travel cylinder 116 retracts to roll main beam 26 along sub beam 84 at an angle to longitudinal axis 178. Spherical bearings 120, 122 allow lateral and vertical swinging of the cylinder 116 and rod relative to the main and sub beams. Spherical bearing 120 of rod 116 is connected by means of a bracket 122 to main beam 26, and sub beam 84 remains stationary on the ground while the roller assemblies each move rectilinearly along individual paths on sub beam 84 but at different angles relative to the longitudinal axis, indicated at 178.

Figure 6E:
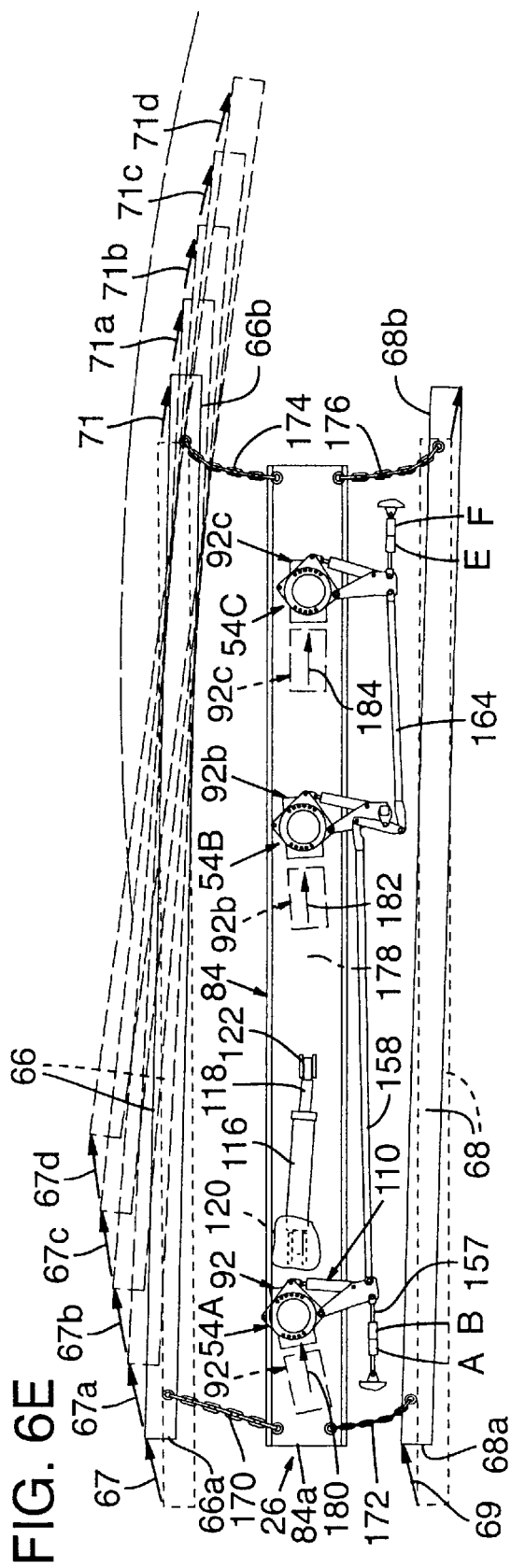
FIG. 6E illustrates simple steering over several cycles of one of the main beams used to carry the drilling rig.

As shown in FIGS. 6C and 5D, roller assembly 92 moves along a rectilinear path represented by arrow 180, offset at an angle of 12° from longitudinal axis 178. FIG. 6C shows that roller assembly 92b moves rectilinearly along path 182 angled at 4° relative to longitudinal axis 178, and roller assembly 92c is translated rectilinearly along path 184 which coincides essentially with longitudinal axis 178. The net result is that main beam 26 translates laterally more at its rear section than it does at the front shown in FIG. 6C, ends 66a and 68a have moved upwardly to the right along diagonals 67 and 69. Ends 66b and 68b have not translated laterally as much because roller assembly 92 was angled at a greater amount relative to longitudinal axis 178 than roller assemblies 92b and 92c. The net effect is that main frame 26 has moved along a curvilinear path to the right, and slightly clockwise as shown in FIG. 6E. This path approximates an arc formed by interconnecting rectilinear paths 67, 67a, 67b, 67c and 67d, as shown in FIG. 6E. The path of end 68b also approximates an arc formed by interconnected rectilinear paths 71, 71a–d.

When rod 118 has been fully retracted, i.e. through a stroke of 44 inches, chain 170 will become tightened, chain 172 will slacken because top flange 68 and its corresponding wall will be moved closer to sub beam 84, and chains 174 and 176 will slacken somewhat as well. Chains 170, 172, 174 and 176 are all the same length because they are attached on the main beam at equal distances from their respective attachment points on the sub beam. The chains may be differently sized if attached at asymmetric points on the main beam or on the sub beam. In any case, the chains are preferably sized to limit the movement of the roller assemblies relative to the sub beam so that the roller assemblies do not travel beyond the edges of the sub beams.

The next step requires centering of sub beam 84, so that its longitudinal axis 178 corresponds to the longitudinal axis between the side walls of main beam 26, and this is shown in FIG. 6D. The lift assemblies must be retracted so that the roller assemblies and their rollers no longer engage sub beam 84. After the rams have been fully retracted, cylinder 116 is actuated to extend rod 118 to push or slide sub beam 84 along the surface to the right which causes end 84a to move clockwise, from its position in FIG. 6C, to a position whereby chains 170, 172, and 174, 176 are tightened, preventing further travel of the sub beam. In this position, longitudinal axis 178 is parallel to the side walls of main beam 26 as shown. Thus, it can be seen that the chains provide a centering mechanism for realigning the sub beams with the main beams.

With the lift assemblies retracted, a new cycle can begin, with different angles adjusted for the roller assemblies if needed. If several cycles are required, assuming that main beam 26 is being displaced to the right, and steered, the resultant path will approximate a curvilinear line. FIG. 6E shows the path followed by flange 66 of main beam 26 through five cycles. The path of flange 68 in main beam 28 is similar. The first rectilinear paths of opposite ends 66a and 66b of flange 66 are shown at 67 and 71. After sub beam 84 has been moved and the cycle of the main beams repeats, the next rectilinear path of the ends of flange 68 are shown at 67a and 71a. If three more cycles are completed, the total path is represented by interconnecting rectilinear paths 67, 67a–d and 71, 71a–d. These rectilinear paths when joined, as shown in FIG. 6E, form polygonal paths which approximate curvilinear lines. Main beam 28 follows along in this same sequence, and it is to be understood that the service module will be controlled as well, by moving its main beams 30 and 32 along its sub beams so that the service module and drilling rig maintain their relative positions. Assuming that conductor pipes mare about 10 feet apart on center, and cylinder 116 is powered to extend rod 118 for a stroke of 44 inches, about three cycles would be required to cover about 10 feet.

The service module's 12 lift assemblies are actuated by a hydraulic system having four zones of three hydraulic cylinders each, valved to form separate pumps. Two 40 horsepower electric motors drive the dual pumps.

The present invention provides that the roller assemblies, and their accompanying rollers, are displaced rectilinearly as they travel along sub beam 84, in the step shown in FIG. 6C. The rollers themselves do not travel on a curvilinear path on the sub beams. As described, however, main beam 26 moves approximately in an arc and this is accomplished, without damage to the rollers or the linkage arms, by provision of the spring cartridge assemblies, which ensure that the twisting force from the main beam is isolated from the roller assemblies and rollers. There is a tremendous weight on the rollers, and they are designed to roll along a rectilinear path. Spring cartridge assembly 138 provides a construction which enables the twisting forces from the main beam 26, which would be transmitted through cylinders A, B and push rod 157 to steering arm 110, to be isolated or minimized. The force is absorbed by the spring cartridge assembly, and results in controlled pivoting of steering arm 110 at bolt 112, and flexing of the rods and linkage arms which can be best understood from a consideration of FIGS. 5D and 5E.

It will be recalled that the lifting assemblies, such as lifting assembly 54A were actuated so that their rams were retracted, and lifting assembly 54A was rotated so that its roller assembly 92 would be directed at an angle of 12° relative to longitudinal axis 178 to follow a path 180. That angle was set by extending rod 157 a predetermined amount. As shown in FIG. 5D, it can be seen that spring cartridge assembly 138, which is connected to steering arm 110 at 140 and to bracket 102 at 154, will transmit the force from rod 157 and steering arm 110 to turn the roller assembly 92 the required 12°.

This takes place because spring 146 is in a preloaded state with its washers 148 and 150 bottomed out against an end 142a of cylinder 142 and spaced-apart bolts 143 which extend through cylinder 142. This creates a rigid link between bolts 140 and 154 so that the force transmitted from the steering arm is transmitted to brackets 102 and 104 and thereby to roller assembly 92 to turn it 12°, for example. (The same rigid link is formed if a −12° angle were preset, for example.) However, the rotational or twisting force of the main beams, during displacement of roller assembly 92 along path 180, is not transmitted to roller assembly 92 when the full weight of the load is transferred through the rams onto the sub beams. The reason for that can be appreciated from a viewing of FIG. 5E, which shows travel of roller assembly 92 from left to right along path 180. The twisting or flexing force of the main beams is transmitted from cylinders A (not shown) and B through rod 157 to steering arm 110.

Similarly, forces are also being transmitted to the other roller assemblies and rollers. These forces may be thought to pull or rotate the steering arms, for example steering arm 110, in a clockwise direction about its pivot connection defined by bolt 112 and a downward force on pin 140 which pulls cylinder 142 downwardly (as seen in FIG. 5E) and a downward force at bolt 154. This causes end 142a of cylinder 142 to bear against washer 148 which in turn compresses spring 146 from its preloaded position shown in FIG. 5D a distance represented at 188. The angle of this clockwise motion is represented by φ in FIG. 5E. Spring 146 absorbs the twisting forces from the main beam, and roller assembly 92 can continue along rectilinear path 180.

If spring cartridge assembly 138 were not utilized, but rather a solid link, turning of the main beams would exert forces against the rollers to diverge from their straight line paths 180, 182 and 184 and create tremendous stresses on the roller assemblies, possibly leading to the failure of the steering cylinders, rods, or arms. With use of the spring cartridge assembly, the twisting forces from the main beams are absorbed or deflected. Simple steering, as described above and with reference to FIGS. 6B–D, and complementary steering which will be described later with reference to FIGS. 8A–8G, requires that these forces be isolated because the roller assemblies are positioned at different angles relative to one another so that they travel along straight lines but the main beams are steered in an approximate arc.

Assuming that a −12° angle has been preset, as shown in FIG. 5F, the spring cartridge assembly will continue to isolate or absorb forces from turning action of main beam 26. As shown, the turning action of the main beam, now in an opposite sense, creates a force which is isolated or absorbed in spring 146, now compressed by the action of bolt 143 pressing against washer 150, resulting in spring 146 being compressed from its preloaded position shown in FIG. 5D a distance represented at 189.

Figure 7A:
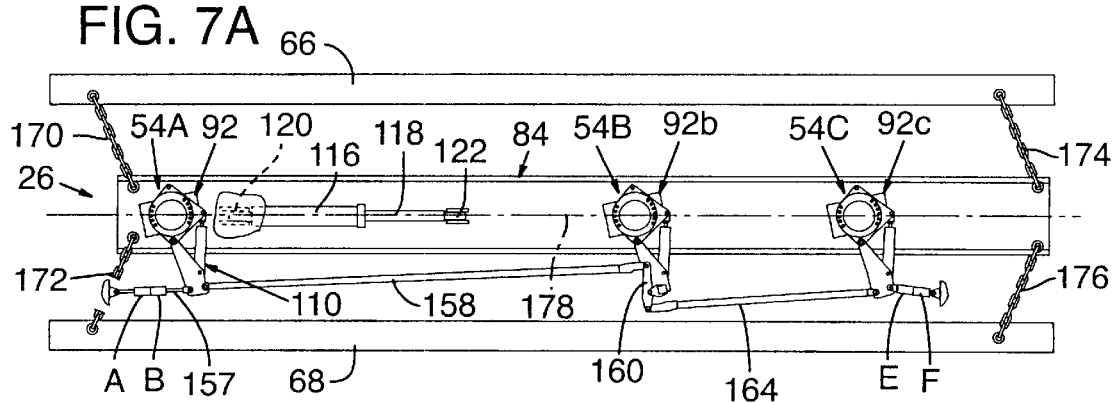
FIGS. 7A, 7B and 7C illustrate, in sequence, one of the main beams used to carry the drilling rig as it is steered in so-called "crab" steering.
Figure 7B:
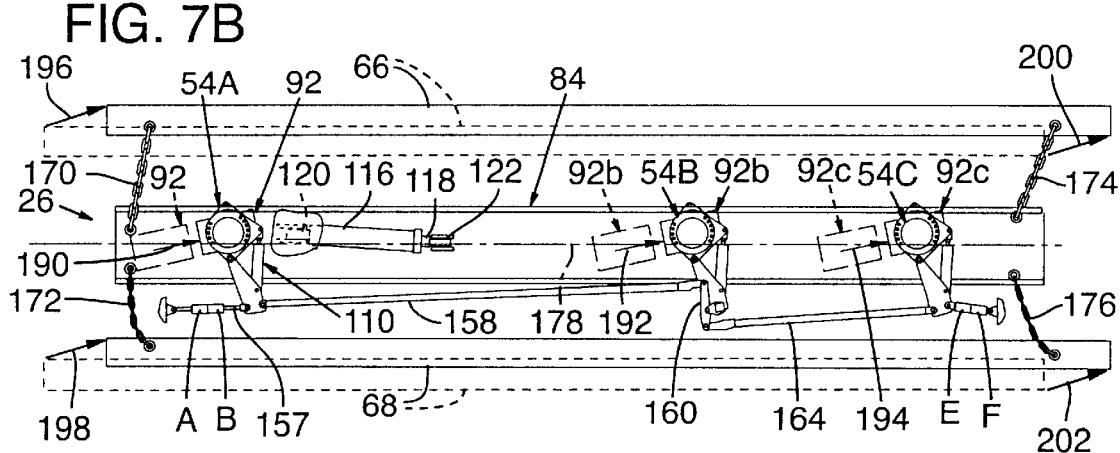
Figure 7C:
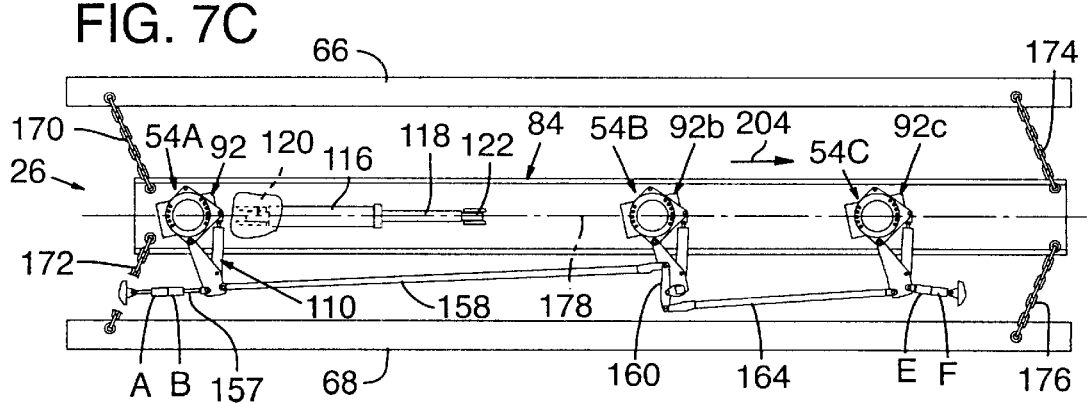

There are other steering modes which can be accomplished using the method and apparatus of the present invention. For example, as shown in FIGS. 7A–7C, so-called "crab" steering may be accomplished using the arrangement of the present invention. As shown in FIG. 7A, crab steering is initiated in the first instance by orienting the roller assemblies at the same angle relative to the longitudinal axis of the sub beam. When the rams of the lifting assemblies have been retracted, and it is desired to set all of the roller assemblies at, for example, 12°, cylinders A and B are actuated so that their rods are extended while cylinders E and F are both retracted so that all of the roller assemblies are rotated at an angle of 12° counterclockwise relative to longitudinal axis 178. In the next step, as shown in FIG. 7B, the rams of the lift assemblies are extended so that the rollers of the roller assemblies engage the sub beam.

Cylinder 116 is then actuated so that its rod is retracted, thereby displacing each of the roller assemblies rectilinearly, albeit at an angle relative to the longitudinal axis of sub beam 84. Specifically, roller assembly 92 travels along rectilinear path 190 (the same as path 180), roller assembly 92b along path 192 and roller assembly 92c along path 194. Because main beam 26 is supported on the lifting assemblies and the roller assemblies and their rollers, it moves diagonally upwardly to the right, without either the front or rear end of the main beam turning more relative one to another, as was the case with simple steering. The main beam has moved parallel to longitudinal axis 178 to the position shown in the solid lines from that shown in the dotted lines, in the direction of arrows 196, 198 and 200, 202. Because the translation along sub beam 84 is rectilinear, there is no twisting or flexing of the main beam transmitted to the roller assemblies. Accordingly, the spring cartridge assemblies remain in their neutral or preloaded states, and do not need to compensate for any twisting or rotation forces which would be applied to the roller assemblies during simple steering.

The final step, as shown in FIG. 7C, is accomplished by actuating the lift assemblies to retract the rams, and their respective roller assemblies to lower the main beams, such as main beams 26 and 28 to the surface where the load is transferred. Travel cylinder 116 is actuated to extend rod 118 which slides or pushes sub beam 84 along the surface in the direction of arrow 204. That direction is essentially parallel to longitudinal axis 178, and the chains are then tightened in the chain centering sequence as shown in FIG. 7C.

Figure 8A:
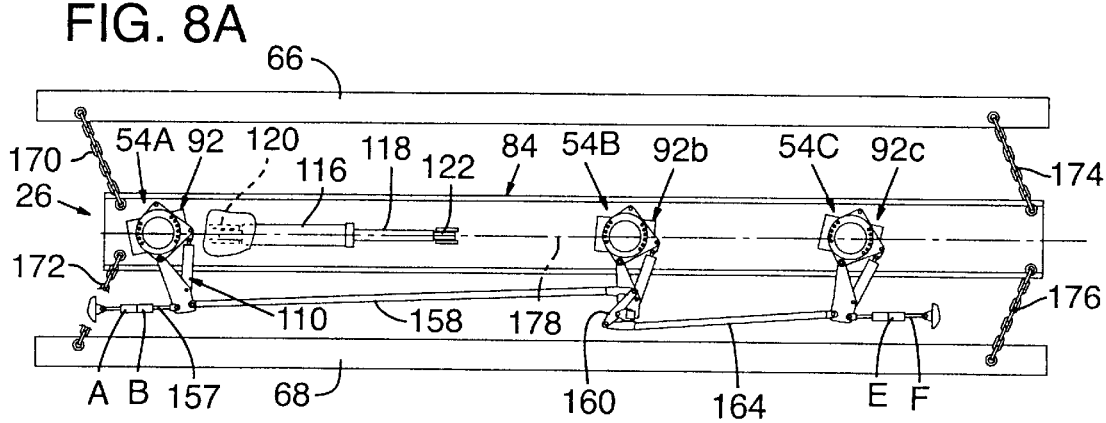
FIGS. 8A, 8B and 8C illustrate, in sequence, steering of one of the main beams used the drilling rig as it is steered in complementary steering.
Figure 8B:
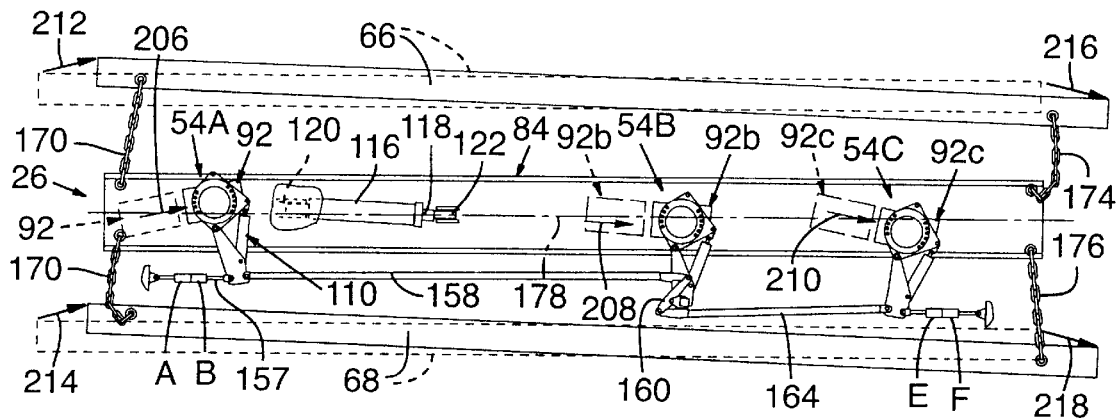
Figure 8C:
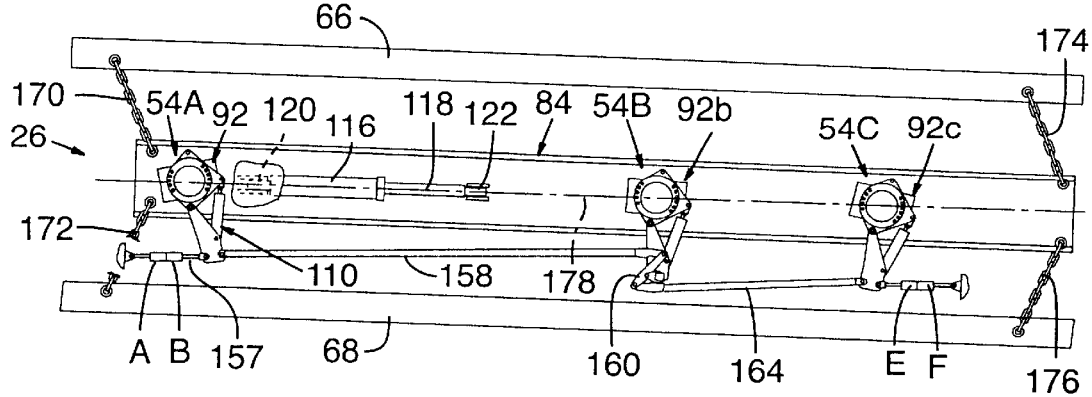

The method and apparatus of the present invention provide adaptations to further modes of directional transport, such as complementary steering which involves displacing the main beams in a forward direction with the same degree of steering at the front and rear roller assemblies. For example, as shown in FIG. 8A, assuming that the roller assemblies have been previously oriented and now lowered onto sub beam 84, it can be seen that roller assembly 92 is set at an angle of 12° relative to longitudinal axis of sub beam 74, whereas roller assemblies 92b and 92c have been oriented at −4° and −12°, respectively, relative to longitudinal axis 178. As shown in FIG. 8B, as travel cylinder 116 retracts rod 118, roller assembly 92 travels along a rectilinear path 206, roller assembly 92b along a rectilinear path 208, and roller assembly 92c along a rectilinear path 210 angled at −12° relative to the longitudinal axis of sub beam 84. The resulting travel of raised main beam 26 follows the arrows to turn the main beam counterclockwise while moving it to the right. The rear of the main beam moves diagonally upwardly, as indicated by arrows 212, 214 while the right end moves diagonally downwardly, such as shown by arrows 216, 218. This complementary steering is yet another method for operators of the apparatus for the drilling rig and service modules to maintain their relative positioning while the operator of the drilling rig can precisely position main beams 26 and 28 over a selected well bore, or other desired location.

An alternative form of the steering mechanism for rotating the roller assemblies to a predetermined angle relative to the longitudinal axis of the sub beams is shown in FIG. 9, in schematic view, without representation of the top flanges of the main beam or inclusion of a sub beam. Steerable lift assemblies 54A–C are interconnected with a hydraulic tie-rod system and linkages different from that shown in FIG. 6A, although the basic geometry for steering remains the same. As shown in FIG. 9, mounting brackets 220 and 222 are rigidly secured to corrugated walls 64 and 76 of main beams 26 and 28, respectively (the top flanges of the main beams are not shown). Corrugated walls 62 of main beam 26 and 78 of main beam 28 are also illustrated, and hydraulic cylinders A–H correspond essentially in function to those of hydraulic cylinders A–H shown in FIG. 6A. However, the hydraulic cylinders are connected by linkage arms arranged differently, although the system functions to steer identically. For example, cylinders A and B are interconnected by a rod 224, cylinders C and D by a rod 226, cylinders E and F by a push rod 230 and cylinders G and H by a rod 231.

Again, a hydraulic tie-rod assembly is used, in this case four paired sets of hydraulic lines 232, 234 and 236, 238 are suitably connected to a HPU and related equipment. In the neutral orientation of the steering arms as shown, hydraulic fluid under pressure is directed through lines 232a and 234a to extend cylinder A, retract cylinder C and retract cylinder B and extend cylinder D. In this neutral position, hydraulic fluid is directed through lines 236a and 238a so that cylinders E and H are retracted and F and G are extended. The geometry of the rods and linkages, such as push rods 228, 242 and 229, 243 is essentially the same geometry as described with reference to FIG. 6A.

The difference in the construction shown in FIG. 9 is the provision of rods 224 interconnecting cylinders A and B on main beam 26 and rod 226 interconnecting cylinders C and D on main beam 28. Additionally, rod 230 interconnecting cylinders E and F and rod 231 interconnecting cylinders G and H are provided. This construction enables the mounting of cylinders B and E on mount 220, and the mounting of cylinders D and G on mount 222. The mounts interconnect rods 224, 230, 226 and 231 to the main beams, but no twisting or turning forces would be transmitted through these rods to the steering arm and thus to the roller assemblies. The spring cartridge assemblies 138, 139 and 141 on main beam 26 and those shown on main beam 28 again enable forces applied from the main beams, when they are turning, to be absorbed by the springs in the spring cartridge assemblies, similar to that described previously. Assuming simple steering, and assuming that cylinder A has been actuated so that its rod has pivoted the steering arm 12° and cylinder C has been actuated to extend its rod, so that the roller assemblies on lift assemblies 54A and 56A have been rotated counterclockwise, a lesser amount of rotation, due to the linkage system, will be provided to the roller assemblies on lift assemblies 54B and 56B. For simple steering, cylinders E, F and G, H will be actuated to maintain lift assemblies 54C and 56C in their neutral positions, which results in maintaining steering arm 115 of lift assembly 54C and the steering arm for lift assembly 56C in their neutral positions. Simple steering can then be provided when the lift assemblies are extended so that the roller assemblies engage corresponding sub beams 84 and 86 and the travel cylinders 116 are retracted.

Geometry of the Steering Mechanism

The steering system and its mechanism provide for aligning the roller assemblies for steering about a single steering point P, as shown in FIG. 11. A set of lines R1, R2, R3, each defining a transverse axis through a center point of a roller assembly perpendicular to the direction of rectilinear motion of the roller assembly, all intersect at steering point P. In the simple steering of main beam 26 shown in FIG. 11, the rear and intermediate roller assemblies 92 and 92b, respectively, have been rotated from their neutral position, and the forward roller assembly 92c remains in the neutral position, so that the transverse axes of the roller assemblies all intersect at steering point P. FIG. 11 shows that where the rear roller assembly is rotated to a first angle, then the intermediate roller assembly needs to be rotated to a lesser degree in order for its transverse axis R2 to be pointed to steering point P.

The steering system of the present invention, shown in FIGS. 6A and 10, whether used in simple, crab or complementary steering mode, has been designed to incorporate certain dimensional relationships for the pivot connection between the steering arms, floating links and push rods. This relationship holds regardless of the spacing between the roller assemblies. As shown in FIG. 6A, which includes only three roller assemblies on a main beam, the relationship is defined by: X/M=K/L, where K is the distance between intermediate roller assembly 92b and front roller assembly 92c, L is the distance between rear roller assembly 92 and front roller assembly 92c, X is the distance between pivots 162 and 163 and Y is the distance between pivots 161 and 162. J is the distance between roller assemblies 92 and 92c.

Push rods 158 and 164 and link 160 are arranged to provide the correct proportional steering to rotate the roller assemblies so that their transverse axes all point at and intersect at steering point P in any steering mode. As shown in FIGS. 6A–D, extension of cylinders A and B is translated directly to steering arm 110 of rear roller assembly 92 and also to push rod 158. That is, steering arm 110 and push rod 158 move just as far as cylinders A and B. However, the movement of push rod 158 moves steering arm 113 of roller assembly 92b by a proportionally lesser amount because push rod 158 pushes on link 160 at pivot 161, causing link 160 to rotate about pivot 163 while moving steering arm 113 at pivot 162. Steering arm 113 thus moves a distance reduced by the ratio of X/M in response to movement of push rod 158, where X/M is the ratio of the distance between pivots 162 and 163 to the distance between pivots 161 and 163, as shown in FIG. 6A.

In general terms, the farther an intermediate roller assembly is from the rear roller assembly, the less the proportion of the rotation of the rear roller assembly needs to be translated to the intermediate roller assembly, to maintain single steering point P. In the example shown in FIG. 6A, intermediate roller assembly 92b is about two-thirds of the distance from rear roller assembly 92 to front roller assembly 92c. Thus, the ratios of K/L and X/M are about one-third, and rotation of the rear roller assembly by 12° produces 4° rotation of intermediate roller assembly 92b, assuming front roller assembly 92c remains neutral.

In simple steering, shown in FIGS. 6B and C, the rotation of rear roller assembly 92 does not cause the front roller assembly 92c to rotate. This is because cylinders E and F have not been changed from their initial neutral position, and push rod 164 does not move. Thus, front roller assembly 92c is still aligned in its neutral position 97. When the front roller assembly is steered by cylinders E and F, proportional steering propagates back to the intermediate roller assembly from the front roller assembly in a manner similar to the proportional steering provided from the rear roller assembly. As can be seen in FIG. 6A, movement of cylinders E and F will be translated directly into movement of steering arm 115, but only a proportionally reduced amount of movement will be translated to steering arm 113 of intermediate roller assembly 92b. Thus, when steering arm 115 is moved, push rod 164 will move pivotal link 160 at pivot 163 and steering arm 113 will move a distance reduced by the ratio of Y/M as compared to the distance moved by arm 115 and push rod 164.

Pivotal link 160, a so-called "floating" link, allows simultaneous steering using hydraulic cylinders A, B, E, and F, and the resulting angular movement of steering arm 113 is the algebraic sum of the angular movements produced by the front steering times Y/M plus rear steering times X/M. For the case where K is equal to ⅓ of L, the angular movement of steering arm 113 is one-third of the angular movement of steering arm 110 plus two-thirds of the angular movement of steering arm 115. Thus, as shown in FIG. 6B, with roller assembly 92 set at 12° relative to the longitudinal axis 178, roller assembly 92b will be pivoted to one-third of 12°, i.e., 4°. By locating pivot 162 on link 160 so that X/M equals K/L, the roller axes of the rollers on intermediate roller assembly 92b, substantially lie on a radial line R2 which intersects at the single steering point P, as shown in FIG. 11.

The steering geometry described above can be adapted for any number of intermediate roller assemblies, as shown in FIG. 10, which illustrates the steering mechanism including hydraulic cylinders Q and R, lift assemblies 58A–F, 60A–F, roller assemblies 95a–f, 97a–f, push rods 159, 161 and 159a, 161a, floating links 169a–d and 171a–d as they are incorporated on main beams 30 and 32 respectively, which forms the substructure for the service module. Tie rods are shown and 163 and 173 which interconnect the steering mechanism on main beam 30 to that on main beam 32. The service module weighs approximately 3,000 tons and is 135 feet long, requiring the six lift assemblies for each main beam, as shown.

FIG. 10, illustrates the general relationship of the pivot points between the steering arms, floating links and push rods. As shown, each floating link is pivotally connected to its associated push rods and arranged as follows: S/M E/L, T/M F/L, U/M=G/L and V/M=H/L. In FIG. 10, the spacing between the roller assemblies is equal on main beams 30 and 32, although different spacings could be used. Assuming that roller assembly 95a is displaced to an angle α, and roller assembly 95f is displaced to an angle θ, then roller assemblies 95b, 95c, 95d and 95e will be rotated to angles β, χ, δ, and ε, respectively, computed as follows:

Angle $\beta = 0.8\alpha + 0.2\theta$ $\chi = 0.6\alpha + 0.4\theta$ $\delta = 0.4\alpha + 0.6\theta$ $\epsilon = 0.2\alpha + 0.8\theta$ As an example of how this works, for simple steering, we assume that cylinder Q has been retracted to rotate roller assembly 95a to an angle a of say, 10°, with cylinder R and its roller assembly 95f in neutral position, where angle θ is 0. The intermediate roller assemblies would thereby be rotated by push rods 159 and 161 to the following angles:

| Angle | Roller Assembly |
|---|---|
| $\beta = 0.8(10°) + 0.2(0) = 8°$ | 95b |
| $\chi = 0.6(10°) + 0.4(0) = 6°$ | 95c |
| $\delta = 0.4(10°) + 0.6(0) = 4°$ | 95d |
| $\epsilon = 0.2(10°) + 0.8(0) = 2°$ | 95e |

For crab steering, assuming α and θ are rotated to 10°, the push rods/floating links rotate all the other roller assemblies 10°, computed as follows:

Angle $\beta = 0.8(10°) + 0.2(10°) = 10°$ $\chi = 0.6(10°) + 0.4(10°) = 10°$ $\delta = 0.4(10°) + 0.6(10°) = 10°$ $\epsilon = 0.2(10°) + 0.8(10°) = 10°$ For complementary steering, assuming that α equals 10° and θ equals −10°:

| Angle | Roller Assembly |
|---|---|
| $\beta = 0.8(10°) + 0.2(-10°) = 6°$ | 95b |
| $\chi = 0.6(10°) + 0.4(-10°) = 2°$ | 95c |
| $\delta = 0.4(10°) + 0.6(-10°) = -2°$ | 95d |
| $\epsilon = 0.2(10°) + 0.8(-10°) = 6°$ | 95e |

The mechanical tie rods indicated at 163 and 173 operate to correspondingly orient the roller assemblies 97a–e associated with lift assemblies 60A–60F on main beam 32 in all modes of steering.

It should be pointed out that FIG. 10 is a schematic view showing the steering mechanism. In the field, the steering arms extend through an associated aperture formed in an adjacent wall of a main beam. For example, as seen in FIG. 1, the steering arms on lift cylinders 58A and 60A extend through an aperture in a side wall main beams 30 and 32, respectively.

Further examples of how the main beams and corresponding sub beams could be arranged are shown in FIGS. 12–14. As shown in FIG. 12, a single main beam could be provided, which rides on a pair of laterally-opposed sub beams. Specifically, a main beam is generally indicated at 250 and includes laterally-opposed elongate walls 252, 254 interconnected by a cross beam 256. Included would be a series of cross beams, spaced apart, and extending down the length of walls 252 and 254. The cross beams serve to mount the cylinders of lift assemblies 258 and 260 and track members or sub beams are indicated at 262 and 264. Steering arms are shown at 266 and 268 and rams 270 and 272 have been extended to raise 250 above the surface.

FIG. 13 shows another embodiment of a main beam generally indicated at 274 in which laterally opposed walls 276 and 278 are interconnected by a K-brace construction 280. Large cantilevered brackets 282 and 284 extend in an outboard construction for mounting cylinders 286 and 288, respectively. The sub beams are also positioned in an outboard arrangement, with sub beam 290 being placed outside of wall 276 and sub beam 296 being placed outboard of wall 278.

Still another example of an embodiment of a main beam is the construction shown in FIG. 14. Main beam 294 is shown with a platform-style sub beam generally indicated at 296. Each of the embodiments shown in FIGS. 12-14 operates essentially as the embodiment shown with respect to main beams 26 and 28. The point is that further constructions of the main beam and sub beams may be provided while retaining the essential features of the present invention.

While FIGS. 4A–4D illustrate displacement of main beam 26 and sub beam 84 to the right, it is to be understood that displacement of these structures could be to the left if required. The apparatus of the present invention enables back-and-forth movement as well as steering, and to shift the structure to the left, viewing FIGS. 4A–4D, a reversal of the cycle or sequence as described is necessary.

The examples given above concerning steering illustrate orienting the roller assemblies at various angles, relative to the longitudinal axis of an associated sub beam. A 12° angle has been shown in FIGS. 5D and 5E, and a −12° angle in FIG. 5F. Also, roller assembly 92 has been rotated to a 12° angle as shown in FIGS. 6B–6E (simple steering), FIGS. 7A–7C (crab steering) and FIGS. 8A–8C (complementary steering). These are for illustrative purposes only, bearing in mind that other orientations may be required in different applications. With the apparatus described, as it is used in the field, and with the dimension referred to previously, maximum angles for steering have been found to be most effective in the area of about 6°. Additionally, while the description in this case has focused on transporting the loads to the right, transport to the left could also be readily accomplished. Steering, in accordance with the modes specified could be directed to follow paths generally clockwise or counterclockwise, as required for proper positioning of the loads, such as a drilling rig and accompanying service module, selected by operators with a specific target.

From the above description, it should be appreciated that the present invention provides a method and steerable transport apparatus enabling extremely heavy loads to be readily displaced and precisely turned to be positioned over a relatively small area, such as a conductor pipe at an oil drilling site. The relatively simple construction which provides substructures for carrying and transporting a pair of loads, such as a drilling rig and a service module. While shown and illustrated with a pair of main beams for each of the substructures carrying the drilling rig and service module, it is to be appreciated that in its broadest sense, the present invention contemplates a substructure with an adjacent sub beam, which serves as a track member or travel path. The steerable lift assemblies mounted on the substructure includes roller assemblies, which may be selectively rotated to preset angles, relative to the longitudinal axis of a sub beam, or a travel path, so that steering of the main beam or substructure can be accurately directed by an operator in a selected mode, i.e., simple steering, crab steering, complementary steering or other configurations.

The track member or sub beam of the present invention remains on the surface (such as the ground, snow, gravel, etc.) during all phases of a transport cycle. This means that the sub beam provides two functions without the necessity for it being elevated and shifted above the surface during a travel sequence: it provides a structural support for carrying an associated main beam when the latter is elevated, and also provides an expanse for receiving rollers which may be translated thereon. The sub beam requires no auxiliary equipment to lift it during a travel sequence. Only a relatively simple shifter mechanism in the form of a hydraulic cylinder and rod is required to slide a sub beam along the surface when it is free of the weight of a main beam and its load.

The roller assemblies of the present invention, mounted on the lift assemblies, travel along rectilinear paths which can be selectively oriented relative to the longitudinal axis of a sub beam. When a main beam is displaced and undergoes simple steering, forces from the turning main beam normally would be transferred to the roller assembly and its rollers via the actuating cylinders and push rods and linkages. Because there is a massive weight applied to the lift assembly, normally the turning forces would be resisted, and the push rods could buckle or fail. Or the roller assemblies would experience forces directed to push them off a rectilinear path. The force-absorbing mechanism, in the form of the spring cartridge assembly of the present invention, prevents the push rods and linkages from buckling and isolates twisting or turning forces from the main beams to the roller assemblies. Moreover, the spring cartridge assembly serves as a rigid link enabling a steering arm to rotate a roller assembly about a selected angle relative to the vertical axis of the lift assembly when the lift assembly is retracted.

The steering system of the present invention enables a pair of heavy loads, such as a drilling rig and a service module, to travel in a selected direction with the relative positions substantially maintained. This finds particular importance because the drilling rig and service module have interconnected equipment; the service module provides electricity, a source of mud for the drilling, gas, etc. to the drilling rig, and these connections must be maintained during transport of the respective substructures. The simplicity of the substructures, which includes the main beams, the lifting assemblies, the sub beams and the steering mechanisms, enables the relative positioning to be maintained, both in straight line travel and travel in which the units are steered.

With the geometry shown, the steering mechanisms can be operated as controlled to preset the amount of desired steering. If steering appears to be in an unfavorable direction, after forward displacement has begun, the rig can be easily stopped, the lifting assemblies actuated to retract their respective rams, and the operator may readjust the angle of the roller assemblies relative to the longitudinal axis of the sub beams.

While the substructures for carrying the drilling rig and service module have been shown to include two main beams, such as main beams 26, 28 and 30,32, other applications may not require the use of two main beams for carrying a load. In other words, two main beams such as shown at 26, 28 may not be required for a drilling rig or some other heavy load. Only a single substructure or main beam may be required. In this instance, the substructure and an associated sub beam would be positioned adjacent each other with lift assemblies mounted on the substructure selectively operable for extension toward the surface of the sub beam. Mounted on each lift assembly would be a roller assembly with rollers so that the rollers would engage the sub beam as described previously, and a shifter mechanism would operate to displace the substructure along the sub beam when the lifting assemblies have raised the substructure. In another embodiment, a first substructure and a second substructure, each for supporting a load above a surface may be utilized for moving first and second loads, respectively. The first and second substructures need not necessarily include a pair of spaced-apart main beams, as shown for the substructures carrying the drilling rig and service module described previously. The point here is that a first substructure may consist of a single unit, disposed adjacent a first track member or sub beam and the second substructure may consist of a second unit for supporting the second load disposed adjacent a second track member having an elongate, substantially planar upper face. Each of the first and second substructures is provided with lift assemblies and each has a roller assembly mounted on one end thereof for mounting rollers so that the first and second substructures, when raised above their respective sub beams may be rolled along those beams for travel therealong by shifter mechanisms.

We claim:

1. A load-carrying transport apparatus for moving a load over a surface, the transport apparatus comprising:
   a substructure for carrying the load above the surface;
   a track member positioned on the surface adjacent the substructure;
   a plurality of lift assemblies mounted on the substructure selectively operable for extension toward the surface to engage the track member and raise the substructure above the surface so that it is carried on the track member, and for retraction to lower the substructure onto the surface and disengage from the track member; and
   a shifter mechanism disposed adjacent the substructure and the track member selectively operable for displacing the substructure along the track member when the lifting assemblies have been extended toward the surface to raise the substructure above the surface and for displacing the track member on the surface relative to the substructure when the lifting assemblies have been retracted and disengaged from the track member.

2. The apparatus of claim 1 wherein each lift assembly is provided with a roller assembly mounted on one end thereof, wherein each roller assembly includes a plurality of rollers, and wherein the track member includes a substantially planar upper face for receiving the rollers to enable the shifter mechanism to displace the substructure by rolling it along the upper face when the lifting assemblies have been extended to engage the rollers against the upper face and raise the substructure above the surface.

3. The apparatus of claim 2 wherein the track member is normally positioned on the surface so that the planar face is directed upwardly to present a travel area for receiving the rollers.

4. The apparatus of claim 3 wherein the substructure includes a main beam construction dimensioned to mount and position the lift and roller assemblies above the upper face of the track member, and wherein the shifter mechanism is operatively connected to the main beam and the track member.

5. The apparatus of claim 4 wherein the shifter mechanism includes a power-driven, hydraulic cylinder and rod, pivotally connected to the main beam and to the track member.

6. The apparatus of claim 4 wherein the main beam includes opposed, laterally spaced-apart walls structurally bridged to define a central region, and wherein the track member is dimensioned to extend within the central region.

7. The apparatus of claim 4 wherein each roller assembly includes a plurality of rollers entrained in a roller frame mounted for rotation about a vertical axis on its respective lifting assembly, and where a steering mechanism mounted to the substructure is operable for selectively positioning at least one of the roller assemblies and its rollers at a preselected angle relative to the longitudinal axis of the track member.

8. The apparatus of claim 7 wherein the steering mechanism includes a steering arm connected to each roller assembly, and wherein a power-driven actuator mechanism is operable for rotating selected ones of the steering arms to rotate their respective roller assemblies to selected angles relative to the longitudinal axis of the track member.

9. The apparatus of claim 8 wherein the power-driven actuator is operable for rotating selected ones of the roller assemblies in opposition to one another.

10. The apparatus of claim 8 wherein the shifter mechanism is operable to displace the main beam at an angle relative to the longitudinal axis of the track member when at least one of the roller assemblies has been rotated so that it travels on the upper surface of the track member at an angle relative to the longitudinal axis when the lifting assemblies have been extended to raise the main beam above the surface.

11. The apparatus of claim 10 further including an alignment structure for realigning the track member along the surface relative to the main beam after the main beam has been displaced at an angle relative to the track member.

12. The apparatus of claim 10 wherein a centering mechanism includes a set of chains mounted at each end of the track member interconnected to opposed walls of the main beam dimensioned to swing the track member at an angle along the surface to center it up with the main beam when the shifter mechanism displaces the track member after the main beam has been moved at an angle relative to the longitudinal axis of the track member.

13. A load-carrying transport apparatus for moving first and second loads over a surface, the transport apparatus comprising:
   a first substructure for supporting the first load above the surface;
   a first track member having an elongate, substantially planar upper face positioned on the surface adjacent the first substructure;
   a second substructure for supporting the second load above the surface;
   a second track member having an elongate, substantially planar upper face positioned on the surface adjacent the second substructure;
   first and second lift assemblies mounted on the first and second substructures, respectively, each having a roller assembly mounted on one end thereof, each roller assembly including a plurality of rollers, and each lift assembly being selectively operable for extension so that its roller mechanism engages the planar face of its adjacent track member and upon further extension to raise its respective substructure above the surface, each lift assembly also being selectively operable for retraction to lower its respective substructure to the surface and disengage from its adjacent track member; and
   first and second shifter mechanisms disposed adjacent the first and second substructures, respectively, each being selectively operable to displace its adjacent substructure by rolling it along its adjacent track member to substantially maintain the relative positioning of the substructures when the lifting assemblies have been extended to raise the substructures above the surface, the shifter mechanisms also being operable for displacing their respective track members in a selected direction on the surface when the lifting assemblies have been retracted from the track members to lower the substructures to the surface.

14. The apparatus of claim 13 wherein each track member includes a substantially planar upper face for receiving rollers to enable each shifter mechanism to displace its adjacent substructure by rolling it along the upper face of its adjacent track member when the lifting assemblies have been extended to engage the rollers against the upper faces of their adjacent track members and raise the substructures above the surface.

15. The apparatus of claim 14 wherein each track member includes a sub beam having a longitudinal axis, each sub beam being normally disposed on the surface so that its planar face is directed upwardly to receive adjacent rollers and provide a travel area for the rollers.

16. The apparatus of claim 15 wherein each substructure includes a main beam construction dimensioned to mount and position their adjacent roller assemblies above the upper face of an adjacent sub beam, and wherein each shifter mechanism is operatively connected to its adjacent main and sub beams.

17. The apparatus of claim 16 wherein each shifter mechanism includes a power-driven, hydraulic cylinder and rod, pivotally connected to its adjacent main and sub beams.

18. The apparatus of claim 17 wherein each main beam includes opposed, laterally spaced-apart walls structurally bridged to define a central region, the sub beam is dimensioned to extend within the central region.

19. The apparatus of claim 18 wherein each roller assembly is mounted for rotation about a vertical axis on its respective lifting assembly, and wherein first and second steering mechanisms are mounted on the first and second substructures, respectively, each being operable for selectively positioning at least one of the roller assemblies on its respective substructure at a preselected angle relative to the longitudinal axis of its adjacent sub beam.

20. The apparatus of claim 19 wherein the roller assemblies are interconnected by a plurality of push rod and link members, and wherein a power-driven actuator connected to the push rods is mounted adjacent the main and sub beams selectively operable for displacing the push rods and links to rotate selected ones of the roller assemblies and their rollers to at selected angles relative to the longitudinal axis of the sub beam.

21. The apparatus of claim 20 wherein the power-driven actuator is operable for rotating selected ones of the roller assemblies in opposition to each other.

22. The apparatus of claim 21 wherein each shifter mechanism is operable to displace its adjacent main beam at an angle relative to the longitudinal axis of its adjacent sub beam when at least one of its roller assemblies has been rotated to be displaced on the upper face of its adjacent sub beam at an angle relative to the sub beam's longitudinal axis when the lifting assemblies have been extended to raise the main beams above the surface.

23. The apparatus of claim 22 further including a centering mechanism for realigning the sub beams along the surface relative to their main beams after the main beams have been displaced at an angle relative to the sub beams.

24. The apparatus of claim 23 wherein the centering mechanism includes a set of chains mounted at each end of the elongate beams interconnected to opposed walls of the main beams dimensioned to swing the sub beams at an angle along the surface to center them up with their adjacent main beams when the shifter mechanisms have displaced the sub beams after the main beams have been moved at an angle relative to the longitudinal axes of the sub beams.

25. A method for transporting a load over a surface, the method comprising:
supporting the load above the surface by a substructure;
selectively extending a plurality of lift assemblies mounted on the substructure to raise the substructure above the surface;
displacing the substructure along a track member positioned on the surface adjacent the substructure;
retracting the lift assemblies to lower the substructure to the surface and disengage from the track member; and
displacing the track member on the surface to move it substantially in the same direction as the substructure.

26. The method of claim 25 including the additional step of orienting a roller assembly having rollers mounted on at least one of the lift assemblies so that the rollers are directed to engage the track member at a selected angle relative to its longitudinal axis prior to the lift assembly being extended so that its rollers engage the sub beam and raise the substructure above the surface.

27. The method of claim 26 wherein the step of displacing the substructure includes steering it by rolling it along a path diagonal to the longitudinal axis of the track member defined by the selected angle.

28. The method of claim 27 wherein the step of displacing the track member on the surface includes aligning the longitudinal axis of the track member so that it is substantially parallel to the longitudinal axis of the substructure.

29. The method of claim 28 including the additional step of limiting the amount of travel of the track member relative to the substructure during displacement of the track member along the surface.

30. The method of claim 26 wherein the step of orienting at least one of the roller assemblies includes rotating it about a substantially vertical axis defined by the lift assembly upon which it is mounted.

31. The method of claim 26 wherein the step of rotating at least one of the roller assemblies includes substantially simultaneously rotating at least one other roller assembly mounted on an adjacent lift assembly.

32. The method of claim 25 wherein displacing the rollers along a rectilinear path is accompanied by displacing ends of the substructure along rectilinear paths which are oriented at different angles.

33. The method of claim 25 including the additional step of orienting a roller assembly on one of the lift assemblies in the same direction as the longitudinal axis of the track member and orienting roller assemblies on the remaining lift assemblies at an angle relative to the longitudinal axis of the track member.

34. The method of claim 25 including the additional step of orienting roller assemblies mounted on the lift assemblies at the same angle relative to the longitudinal axis of the track member prior to extending the lift assemblies and engaging the rollers on the track members so that the displacing step moves the substructure diagonally and parallel relative to the longitudinal axis of the track member.

35. A steerable load-carrying apparatus for transporting a load over a surface, the apparatus comprising:

a substructure for carrying the load above the surface;

a track member providing a steering area, the track member positioned on the surface adjacent the substructure;

a plurality of steerable lift assemblies interposed between the substructure and the track member, each lift assembly being selectively operable for extension to engage the track member and raise the substructure above the surface for support on the track member, at least one of the lift assemblies being selectively positionable to a predetermined angle within a range for moving in the steering area along the track member; and a shifter mechanism disposed adjacent the substructure and the track member selectively operable for displacing the substructure relative to the track member when the lifting assemblies support the substructure on the track member above the surface and for displacing the track member relative to the substructure when the lifting assemblies have been retracted and disengaged from the track member so that the substructure has been lowered onto the surface.

36. The apparatus of claim 35 wherein each lift assembly is provided with a roller assembly mounted on one end thereof, and wherein the track member includes a substantially planar upper face for receiving the roller assemblies to enable the shifter mechanism to displace the substructure by rolling it along the upper face when the lifting assemblies have been extended to engage the roller assemblies against the upper face and raise the substructure above the surface.

37. The apparatus of claim 36 wherein the track member is normally positioned on the surface so that the planar face is directed upwardly to present a travel area for receiving the roller assemblies.

38. The apparatus of claim 35 wherein the substructure includes a main beam construction dimensioned to mount and position the lift and roller assemblies above the upper face of the track member, and wherein the shifter mechanism is operatively connected to the main beam and the track member.

39. The apparatus of claim 36 wherein each roller assembly includes a plurality of roller trained in a roller frame mounted for rotation about a vertical axis on its respective lifting assembly, and where a steering mechanism mounted to the substructure is operable for selectively positioning at least one of the roller mechanisms at a preselected angle relative to the longitudinal axis of the track member.

40. The apparatus of claim 37 wherein the steering arms connected to each roller frame, and a power-driven actuator operable or displacing selected ones of the steering arms to rotate selected ones of the roller frames to selected angles relative to the longitudinal axis of the track member.

41. The apparatus of claim 38 wherein the power-driven actuator is operable for rotating selected ones of the roller frame in opposition to one another.

42. The apparatus of claim 39 further including an alignment structure for realigning the track member along the surface relative to the main beam after the main beam has been displaced at an angle relative to the track member.

43. The apparatus of claim 40 wherein the alignment structure includes a pair of chains mounted at each end of the track member interconnected to opposed walls of the main beam dimensioned to swing the track member at an angle along the surface to realign it with the main beam when the shifter displaces the track member after the main beam has been moved at an angle relative to the longitudinal axis of the track member.

* * * * *